(12) United States Patent
Inagaki

(10) Patent No.: US 12,222,038 B2
(45) Date of Patent: Feb. 11, 2025

(54) VALVE DEVICE

(71) Applicant: DENSO CORPORATION, Kariya (JP)

(72) Inventor: Noriyuki Inagaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 131 days.

(21) Appl. No.: 18/300,510

(22) Filed: Apr. 14, 2023

(65) Prior Publication Data

US 2023/0250880 A1      Aug. 10, 2023

Related U.S. Application Data

(63) Continuation of application No. PCT/JP2021/033318, filed on Sep. 10, 2021.

(30) Foreign Application Priority Data

Oct. 16, 2020   (JP) .................................. 2020-174634

(51) Int. Cl.
| | | |
|---|---|---|
| *F16K 1/226* | (2006.01) | |
| *F16J 15/16* | (2006.01) | |
| *F16J 15/3228* | (2016.01) | |

(52) U.S. Cl.
CPC ........... *F16K 1/2268* (2013.01); *F16J 15/166* (2013.01); *F16J 15/3228* (2013.01)

(58) Field of Classification Search
CPC .. F16J 15/3205; F16J 15/3228; F16K 1/2268; F16K 15/3204; F16K 41/043; F16K 41/0446; F16K 5/0285; F16K 5/0485
USPC ................................................ 251/214, 305
See application file for complete search history.

(56) References Cited

U.S. PATENT DOCUMENTS

| | | | | |
|---|---|---|---|---|
| 3,801,114 A | * | 4/1974 | Bentley ................ | F16J 15/3228 277/577 |
| 4,583,749 A | * | 4/1986 | Hatch .................. | F16J 15/3284 277/573 |
| 4,591,168 A | * | 5/1986 | Holzer ................. | F16J 15/3228 277/560 |
| 2004/0124591 A1 | * | 7/2004 | Sekulich .............. | F16J 15/3228 277/645 |

(Continued)

FOREIGN PATENT DOCUMENTS

| | | |
|---|---|---|
| EP | 2327909 A1 | 6/2011 |
| JP | 2014105764 A | 6/2014 |
| JP | 2021179241 A | 11/2021 |

*Primary Examiner* — Robert K Arundale
(74) *Attorney, Agent, or Firm* — Nixon & Vanderhye P.C.

(57) ABSTRACT

A valve device includes: a seal member that is slidably in close contact with an outer peripheral surface of a rotation shaft; and an annular attachment ring that attaches the seal member to a housing. The seal member has a first-side plate part and a second-side plate part sandwiching and holding the seal member in an axial direction of the rotation shaft. An inner peripheral end of the second-side plate part is positioned radially outside beyond an inner peripheral end of the first-side plate part. An outer surface of the first-side plate part includes an outer peripheral-side region positioned radially outside beyond the inner peripheral end of the second-side plate part and an inner peripheral-side region positioned radially inside beyond the outer peripheral-side region. The outer peripheral-side region is positioned on a first side of the axial direction with respect to the inner peripheral-side region.

6 Claims, 15 Drawing Sheets

(56) References Cited

U.S. PATENT DOCUMENTS

| | | | |
|---|---|---|---|
| 2005/0183705 A1* | 8/2005 | Nanba | F02M 26/50 |
| | | | 123/568.24 |
| 2015/0337963 A1* | 11/2015 | Fujii | F16J 15/322 |
| | | | 277/573 |
| 2021/0388902 A1* | 12/2021 | He | F04B 39/042 |
| 2022/0145995 A1* | 5/2022 | Inagaki | F16J 15/3272 |
| 2023/0175586 A1* | 6/2023 | Ooshima | F16J 15/3228 |
| | | | 277/345 |
| 2023/0250880 A1* | 8/2023 | Inagaki | F16J 15/3228 |
| | | | 251/214 |
| 2024/0167570 A1* | 5/2024 | Ikeda | F16J 15/3212 |

\* cited by examiner

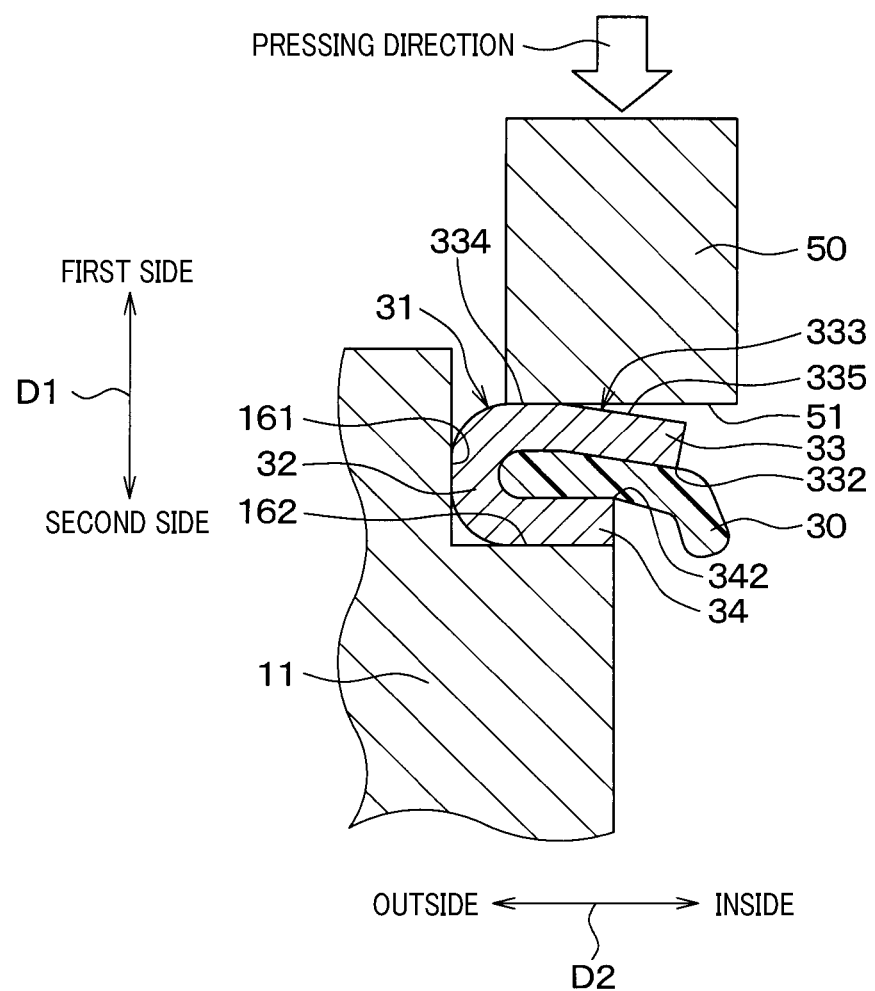

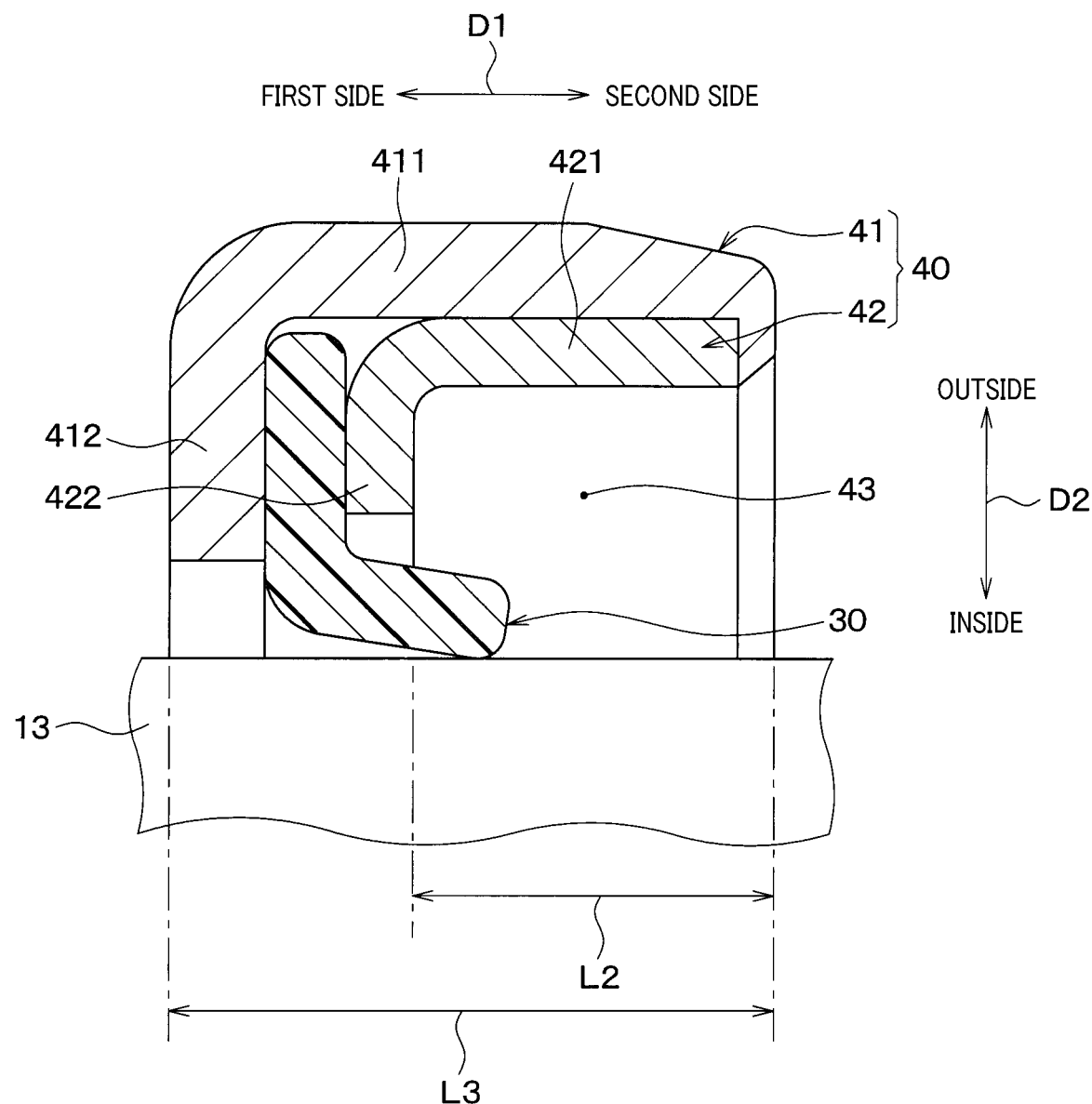

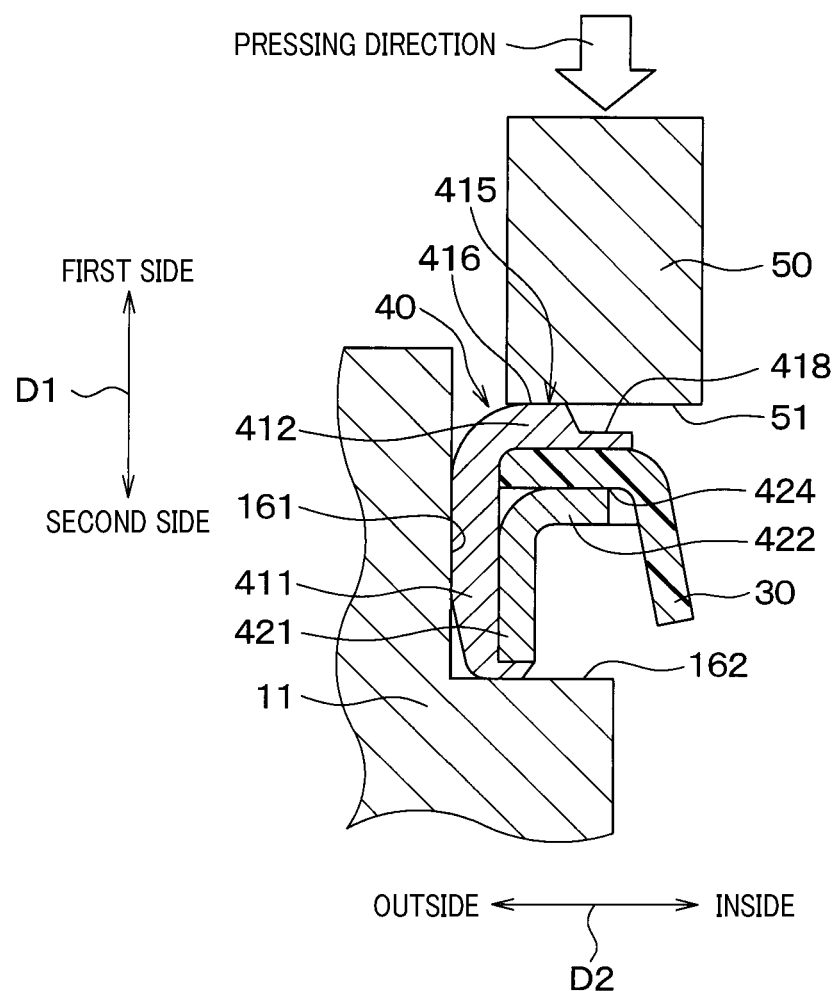

VALVE DEVICE

CROSS-REFERENCE TO RELATED APPLICATION

The present application is a continuation application of International Application No. PCT/JP2021/033318, filed on Sep. 10, 2021, which claims priority to Japanese Patent Application No. 2020-174634, filed on Oct. 16, 2020. The contents of these applications are incorporated herein by reference in their entirety.

BACKGROUND

Technical Field

The present disclosure relates to a valve device.

BACKGROUND ART

A valve device that includes a seal member that prevents passage of a gas between a rotation shaft and a housing, and an attachment ring for attaching a seal member to the housing is disclosed. The seal member is in the shape of a plate with an opening in which the rotation shaft is arranged. The seal member is slidably in close contact with the outer peripheral surface of the rotation shaft. The attachment ring is arranged around the outer peripheral surface of the rotation shaft.

SUMMARY

In the present disclosure, provided is a valve device as the following.

The valve device includes: a seal member that is slidably in close contact with an outer peripheral surface of a rotation shaft; and an annular attachment ring that attaches the seal member to a housing. The seal member has a first-side plate part and a second-side plate part sandwiching and holding the seal member in an axial direction of the rotation shaft. The attachment ring is fixed to the housing in a state where the second-side plate part is in contact with a facing surface of the housing. An inner peripheral end of the second-side plate part is positioned outside in the radial direction of the rotation shaft beyond an inner peripheral end of the first-side plate part. An outer surface of the first-side plate part includes an outer peripheral-side region that is positioned outside in the radial direction beyond the inner peripheral end of the second-side plate part and an inner peripheral-side region that is positioned inside in the radial direction beyond the outer peripheral-side region. The outer peripheral-side region is positioned on a first side of the axial direction with respect to the inner peripheral-side region.

BRIEF DESCRIPTION OF THE DRAWINGS

FIG. 5 is a cross-sectional view of the seal member, the attachment ring, and a housing, which illustrates a part of the manufacturing process of the valve device according to the first embodiment.

FIG. 6 is a cross-sectional view of a part of a valve device according to a first comparative example, which corresponds to FIG. 2.

FIG. 15 is a cross-sectional view of the seal member, the attachment ring, and a housing, which corresponds to FIG. 5 and illustrates a part of a manufacturing process of a valve device according to the fifth embodiment.

DETAILED DESCRIPTION OF THE PREFERRED EMBODIMENTS

Figure 1:
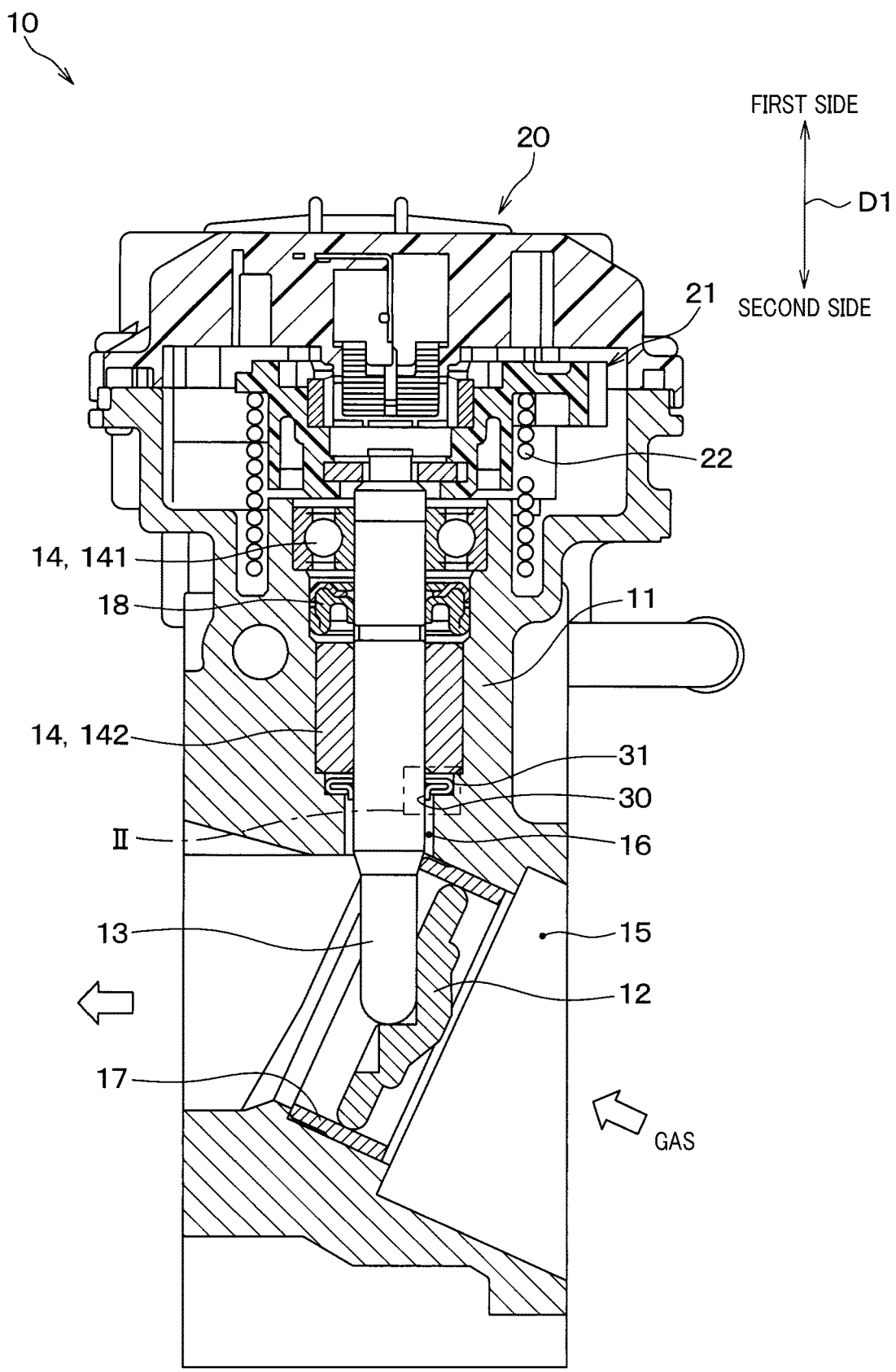
FIG. 1 is a cross-sectional view of a valve device according to a first embodiment.

In the valve device disclosed in PTL 1, the attachment ring has a first-side plate part positioned on one side of the axial direction of the rotation shaft with respect to the seal member, and a second-side plate part positioned on the other side of the axial direction of the rotation shaft with respect to the seal member. Each of the first-side plate part and the second-side plate part is in the shape of a plate extending along the radial direction of the rotation shaft. The seal member is sandwiched and held between the first-side plate part and the second-side plate part. The attachment ring is fixed by press-fitting to the inner wall surfaces of the housing that forms a storage space for storing the rotation shaft.

[PTL 1] JP 2010-65729 A

A configuration in which the attachment ring is fixed in a state of being press-fitted into the housing and a method for assembling the attachment ring to the housing will be described in more detail.

The housing has, as the inner wall surfaces forming the storage space, a tubular wall surface that surrounds the attachment ring and a facing surface that faces the second-side plate part in the axial direction. The attachment ring is fixed to the housing in a state where the attachment ring is in contact with the tubular wall surface and the second-side plate part is in contact with the facing surface. At the time of assembly of the attachment ring to the housing, the attachment ring with the seal member sandwiched is arranged in the space surrounded by the tubular wall surface. The attachment ring in contact with the tubular wall surface is pressed by a press-fit punch into the position in contact with the facing surface. Accordingly, the attachment ring is fixed to the housing.

However, when the attachment ring is pressed by the press-fit punch into the position in contact with the facing surface, loads are applied to the attachment ring from both the press-fit punch and the facing surface. The loads may deform the first-side plate part and excessively compress the seal member. In particular, the present inventor has found a problem that, when the inner peripheral end of the second-side plate part is positioned radially outside beyond the inner peripheral end of the first-side plate part, if the part of the seal member sandwiched in the axial direction between the inner peripheral end of the second-side plate part and the first-side plate part of the attachment ring is excessively compressed, the seal member may become ruptured.

This problem is not limited to a valve device that includes an attachment ring according to the structure described in PTL 1 but may also occur at a valve device that includes an attachment ring of a structure in which a seal member is sandwiched in the axial direction between a first-side plate part and a second-side plate part.

An object of the present disclosure is to provide a valve device that suppresses excessive compression of a portion of a seal member sandwiched in the axial direction between the inner peripheral end of a second-side plate part and a first-side plate part of an attachment ring at the time of assembly of the attachment ring into a housing.

In order to attain the above-described object, according to one aspect of the present disclosure, a valve device includes: a housing in which a gas flow path through which a gas flows and an accommodation space that communicates with the gas flow path and accommodates a rotation shaft are formed; a valve body that is arranged in the gas flow path and adjusts an opening of the gas flow path; the rotation shaft that is arranged in the accommodation space and rotates around an axis to rotate the valve body; a seal member that is arranged in the accommodation space so as to be positioned around an outer peripheral surface of the rotation shaft and is slidably in close contact with the outer peripheral surface of the rotation shaft to prevent passage of the gas between the rotation shaft and the housing; and an annular attachment ring that is arranged in the accommodation space so as to be positioned around the outer peripheral surface of the rotation shaft and attaches the seal member to the housing, wherein the seal member has an outer peripheral end-side part, and the outer peripheral end-side part is in a shape of a plate extending radially outward from the rotation shaft side along a radial direction of the rotation shaft, the attachment ring has: a first-side plate part that is positioned on a first side of an axial direction of the rotation shaft with respect to the seal member and is in a shape of a plate extending along the radial direction; and a second-side plate part that is positioned on a second side of the axial direction with respect to the seal member and is in a shape of a plate extending along the radial direction, the first-side plate part and the second-side plate part sandwich and hold the outer peripheral end-side part of the seal member in the axial direction, the housing has, as inner wall surfaces forming the accommodation space, a tubular wall surface that surrounds the attachment ring and a facing surface that faces the second-side plate part in the axial direction, the attachment ring is fixed to the housing in a state where the attachment ring is in contact with the tubular wall surface and the second-side plate part is in contact with the facing surface, the second-side plate part has an inner surface in contact with the seal member, the inner surface of the second-side plate part has an end inside in the radial direction serving as an inner peripheral end of the second-side plate part, and the first-side plate part has an inner surface in contact with the seal member, the inner surface of the first-side plate part has an end inside in the radial direction serving as an inner peripheral end of the first-side plate part, the inner peripheral end of the second-side plate part being positioned outside in the radial direction beyond the inner peripheral end of the first-side plate part, the first-side plate part has an outer surface which is a surface of the first-side plate part on the first side of the axial direction, and the outer surface of the first-side plate part includes an outer peripheral-side region that is positioned outside in the radial direction beyond the inner peripheral end of the second-side plate part and an inner peripheral-side region that is positioned inside in the radial direction beyond the outer peripheral-side region, and the outer peripheral-side region is positioned on the first side of the axial direction with respect to the inner peripheral-side region.

At the time of assembly of the attachment ring to the housing, the attachment ring with the seal member sandwiched is arranged in the space surrounded by the tubular wall surface. The attachment ring in contact with the tubular wall surface is pressed by the press-fit punch toward the facing surface. Accordingly, the attachment ring is fixed in a state of being press-fitted into the housing.

The press-fit punch presses the attachment ring from the first side to the second side of the axial direction. A pressing surface of the press-fit punch pressing the attachment ring is a flat surface that is perpendicular to the axial direction. The attachment ring is pressed by the press-fit punch into the position where the attachment ring abuts on the facing surface. Accordingly, loads are applied to the attachment ring from both the press-fit punch and the facing surface. At this time, the pressing surface of the press-fit punch is in contact only with the outer peripheral-side region of the outer surface of the first-side plate part. Accordingly, it is possible to limit the range of load application to the attachment ring by the press-fit punch and the facing surface to the area radially outside beyond the inner peripheral end of the second-side plate part. This suppresses excessive compression of the portion of the seal member sandwiched in the axial direction between the inner peripheral end of the second-side plate part and the first-side plate part.

According to another aspect of the present disclosure, a valve device includes: a housing in which a gas flow path through which a gas flows and an accommodation space that communicates with the gas flow path and accommodates a rotation shaft are formed; a valve body that is arranged in the gas flow path to adjust an opening of the gas flow path; the rotation shaft that is arranged in the accommodation space and rotates around an axis to rotate the valve body; a seal member that is arranged in the accommodation space so as to be positioned around an outer peripheral surface of the rotation shaft and is slidably in close contact with the outer peripheral surface of the rotation shaft to prevent passage of the gas between the rotation shaft and the housing; and an annular attachment ring that is arranged in the accommodation space so as to be positioned around the outer peripheral surface of the rotation shaft and attaches the seal member to the housing, wherein the seal member has an outer peripheral end-side part, and the outer peripheral end-side part is in a shape of a plate extending radially outward from the rotation shaft side along a radial direction of the rotation shaft, the attachment ring has: a first-side plate part that is positioned on a first side of an axial direction of the rotation shaft with respect to the seal member and is in a shape of a plate extending along the radial direction; and a second-side plate part that is positioned on a second side of the axial direction with respect to the seal member and is in a shape of a plate extending along the radial direction, the first-side plate part and the second-side plate part sandwich and hold the outer peripheral end-side part of the seal member in the axial direction, the housing has, as inner wall surfaces forming the accommodation space, a tubular wall surface that surrounds the attachment ring and a facing surface that faces the second-side plate part in the axial direction, the attachment ring is fixed to the housing in a state where the attachment ring is in contact with the tubular wall surface and the second-side plate part is in contact with the facing surface, the second-side plate part has an inner surface in contact with the seal member, the inner surface of the second-side plate part has an end inside in the radial direction serving as an inner peripheral end of the second-side plate part, and the first-side plate part has an inner surface in contact with the seal member, the inner surface of the first-side plate part has an end inside in the radial direction serving as an inner peripheral end of the first-side plate part, the inner peripheral end of the second-side plate part being positioned outside in the radial direction beyond the inner peripheral end of the first-side plate part, and the facing surface has a contact area in contact with the second-side plate part, the facing surface has an inner peripheral end which is an end inside in the radial direction of the contact area, and the inner peripheral end of the facing surface is positioned outside in the radial direction with respect to the inner peripheral end of the second-side plate part.

At the time of assembly of the attachment ring to the housing, the attachment ring with the seal member sandwiched is arranged in the space surrounded by the tubular wall surface. The attachment ring in contact with the tubular wall surface is pressed by the press-fit punch into a position where to contact the facing surface. Accordingly, the attachment ring is fixed in a state of being press-fitted into the housing.

The press-fit punch presses the attachment ring from the first side to the second side of the axial direction. The attachment ring is pressed by the press-fit punch into the position where the attachment ring abuts on the facing surface. Accordingly, loads are applied to the attachment ring from both the press-fit punch and the facing surface. In this case, the facing surface is in contact only with the outer peripheral-side region of the outer surface of the second-side plate part, which is positioned radially outside with respect to the inner peripheral end of the second-side plate part. The outer surface of the second-side plate part is a surface of the second-side plate part on the second side of the axial direction. Accordingly, it is possible to limit the range of load application to the attachment ring by the press-fit punch and the facing surface to the area radially outside beyond the inner peripheral end of the second-side plate part. This suppresses excessive compression of the portion of the seal member sandwiched in the axial direction between the inner peripheral end of the second-side plate part and the first-side plate part.

Reference signs in parentheses appended to the names of the constituent elements described in the claims indicate an example of correspondence between the constituent elements in the claims and specific constituent elements in the embodiments described later.

Hereinafter, embodiments of the present disclosure will be described with reference to the drawings. In the following embodiments, identical or equivalent components will be described with identical reference signs.

First Embodiment

A valve device 10 according to the present embodiment illustrated in FIG. 1 is used in an exhaust gas recirculation (EGR) apparatus that allows an exhaust gas to flow back from an inner combustion engine in the air intake path of the internal combustion engine. The valve device 10 increases or decreases the flow amount of the exhaust gas from the internal combustion engine toward the air intake flow path of the internal combustion engine. The valve device 10 includes a housing 11, a valve body 12, a rotation shaft 13, and a bearing 14.

The housing 11 contains a gas flow path 15 in which the gas flows and an accommodation space 16 in which the rotation shaft 13 is accommodated. The gas flowing in the gas flow path 15 is the exhaust gas from the internal combustion engine that flows toward the air intake flow path of the internal combustion engine. The gas flow path 15 constitutes an internal space of the housing 11. The gas flow path 15 is mainly formed of the inner wall surface of the housing 11. The accommodation space 16 communicates with the gas flow path 15. The accommodation space 16 is formed of the inner wall surface of the housing 11. The housing 11 is made of a metallic material such as an aluminum alloy.

A cylindrical nozzle 17 is fixed by press-fitting to the inner wall surface of the housing 11 forming the gas flow path 15. The internal space of the nozzle 17 constitutes a part of the gas flow path 15. The nozzle 17 is made of a material excellent in heat resistance and corrosion resistance (for example, stainless steel).

The valve body 12 is arranged in the gas flow path 15. The valve body 12 adjusts the opening of the gas flow path 15. The valve body 12 is a disc-shaped butterfly valve. The valve body 12 is accommodated in the internal space of the nozzle 17.

The rotation shaft 13 is arranged in the accommodation space 16. The rotation shaft 13 rotates around its axis to rotate the valve body 12. The rotation shaft 13 is fixed to the valve body 12 such that the axis of the rotation shaft 13 is inclined with respect to the diameter direction of the valve body 12. The rotation shaft 13 is made of a material excellent in corrosion resistance (for example, stainless steel).

The bearing 14 is accommodated in the accommodation space 16. The bearing 14 rotatably supports the rotation shaft 13. The bearing 14 is arranged on one side of the gas flow path 15, not on both sides of the gas flow path 15. The bearing 14 includes a rolling bearing 141 such as a ball bearing or a roller bearing and a slide bearing 142 such as a metal bearing. The slide bearing 142 is arranged closer to the gas flow path 15 than the rolling bearing 141.

The valve device 10 also includes an oil seal 18. The oil seal 18 is arranged in the accommodation space 16 between the rolling bearing 141 and the slide bearing 142 in an axial direction D1 of the rotation shaft 13. The oil seal 18 prevents passage of the exhaust gas between the rotation shaft 13 and the inner wall surface of the housing 11 forming the accommodation space 16.

The valve device 10 also includes an electric actuator 20. The electric actuator 20 drives the rotation shaft 13. The electric actuator 20 is attached to the housing 11. The electric actuator includes an electric motor not illustrated, a gear reducer 21, and a coil spring 22. The electric motor generates a rotary motive force when being energized. The gear reducer 21 amplifies the rotation torque of the electric motor and transmits the same to the rotation shaft 13. The coil spring 22 biases the valve body 12 to a valve-opening direction or a valve-closing direction.

The valve device 10 includes a seal member 30 and an attachment ring 31. The seal member 30 and the attachment ring 31 are arranged in the accommodation space 16 so as to be positioned around the outer peripheral surface of the rotation shaft 13. The seal member 30 and the attachment ring 31 are arranged closer to the gas flow path 15 than the bearing 14 is. The seal member 30 is slidably in close contact with the outer peripheral surface of the rotation shaft 13, thereby to prevent passage of the exhaust gas between the rotation shaft 13 and the inner wall surface of the housing 11 forming the accommodation space 16.

Figure 2:
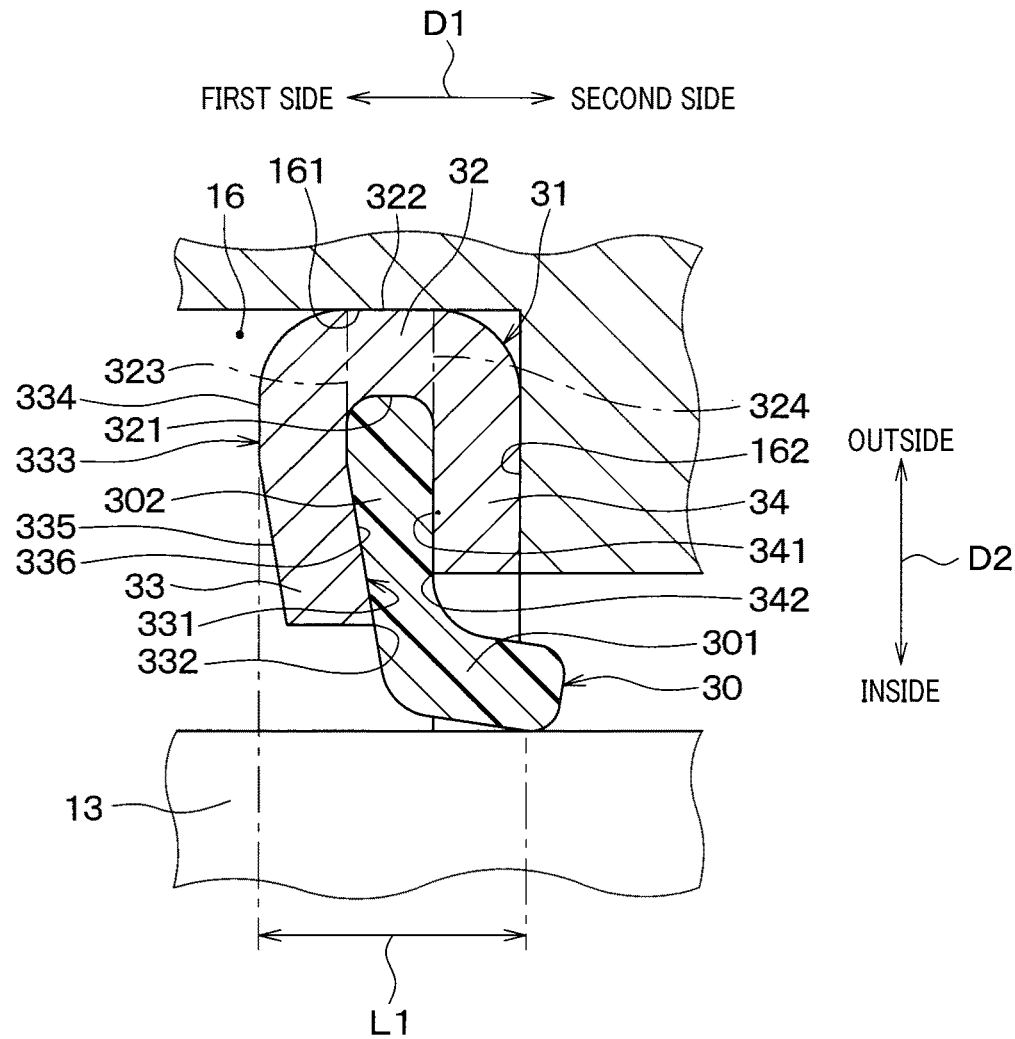
FIG. 2 is an enlarged view of a part II in FIG. 1.

As illustrated in FIG. 2, the seal member 30 has an opening in which the rotation shaft 13 is arranged in the center and is in the shape of a plate extending radially outward, in a radial direction D2, from the rotation shaft 13. In the present embodiment, the shape formed by the outer peripheral end of the seal member 30 in the circumferential direction is a circle. The radial direction D2 is a direction perpendicular to the axial direction D1.

More specifically, the seal member 30 is bent such that an inner peripheral end-side part 301 of the seal member 30 faces the gas flow path 15. That is, the seal member 30 is bent such that the inner peripheral end-side part 301 of the seal member 30 is positioned closer to the gas flow path 15 side in the axial direction D1 than an outer peripheral end-side part 302 of the seal member 30. The second side of the axial direction D1 illustrated in FIG. 2 is the gas path 15 side. The inner peripheral end-side part 301 is slidably in close contact with the outer peripheral surface of the rotation shaft 13. The outer peripheral end-side part 302 is in the shape of a plate extending radially outward along the radial direction D2 from the rotation shaft 13 side. The seal member 30 may however not be bent.

The seal member 30 is made of polytetrafluoroethylene (PTFE) that is a fluorine resin. The seal member 30 may be made of a fluorine resin other than PTFE.

The attachment ring 31 is an annular member for attaching the seal member 30 to the housing 11. The attachment ring 31 is fixed to the housing 11 in a state that is press-fitted to the inner wall surface of the housing 11 forming the accommodation space 16. The attachment ring 31 is made of stainless steel that is a metallic material excellent in corrosion resistance. The attachment ring 31 may be made of a metallic material other than stainless steel. More specifically, the attachment ring 31 has an annular part 32, a first-side plate part 33, and a second-side plate part 34.

The annular part 32 is in an annular shape having an inner peripheral surface 321 and an outer peripheral surface 322. The inner peripheral surface 321 defines an internal space of the annular part 32. The outer peripheral surface 322 forms the outer shape of the annular part 32. The axial direction of the annular part 32 coincides with the axial direction D1 of the rotation shaft 13.

The annular part 32 is positioned around the outer peripheral end of the seal member 30. The inner peripheral surface 321 faces the outer peripheral end of the seal member 30 in the radial direction D2. The diameter of the inner peripheral surface 321 is the same as the outer diameter of the seal member 30. Accordingly, the inner peripheral surface 321 is in contact with the outer peripheral end of the seal member 30. The diameter of the inner peripheral surface 321 may be larger than the outer diameter of the seal member 30.

The entire region of the outer peripheral surface 322 along the axial direction D1 is a cylindrical surface with a constant diameter. That is, the entire region of the axial direction D1 of the outer peripheral surface 322 has the same shape as the side surface of a circular cylinder with a constant diameter. As illustrated in FIG. 2, the entire line formed by the outer peripheral surface 322 is a straight line extending parallel to the axial direction D1 on the cross section of the attachment ring 31 passing through the axis of the attachment ring 31 and taken in parallel to the axis.

The first-side plate part 33 is connected to the entire circumferential region of a first-side end portion 323 of the axial direction D1 of the annular part 32. The first-side plate part 33 is in the shape of a plate extending along the radial direction D2 from the annular part 32 toward the rotation shaft 13. The first-side plate part 33 is positioned on the first side of the axial direction D1 with respect to the seal member 30.

The second-side plate part 34 is connected to the entire circumferential region of a second-side end portion 324 of the axial direction D1 of the annular part 32. The second-side plate part 34 is in the shape of a plate extending along the radial direction D2 from the annular part 32 toward the rotation shaft 13. The second-side plate part 34 is positioned on the second side of the axial direction D1 with respect to the seal member 30. The first-side plate part 33 and the second-side plate part 34 sandwich and hold the outer peripheral end-side part 302 of the seal member 30 in the axial direction D1.

The annular part 32, the first-side plate part 33, and the second-side plate part 34 are formed of one continuous plate material. The cross section of the one continuous plate material, which passes through the axis of the rotation shaft 13 and is in parallel to the axial direction D1, has a U shape.

The housing 11 has, as inner wall surfaces forming the accommodation space 16, a tubular wall surface 161 that surrounds the attachment ring 31 and a facing surface 162 that faces the second-side plate part 34 in the axial direction D1. The facing surface 162 is a flat surface parallel to the radial direction D2. The attachment ring 31 is fixed to the housing 11 in a state where the annular part 32 is in contact with the tubular wall surface 161 and the second-side plate part 34 is in contact with the facing surface 162. At this time, the radially entire region of the outer peripheral surface 322 of the annular part 32 is in surface contact with the tubular wall surface 161. The annular part 32 is press-fitted into the tubular wall surface 161.

With the attachment ring 31 fixed to the housing 11, an inner peripheral end 342 of the second-side plate part 34 is positioned outside in the radial direction D2 beyond an inner peripheral end 332 of the first-side plate part 33. The second-side plate part 34 has an inner surface 341 in contact with the seal member 30, and the inner surface 341 has the inner peripheral end 342 which is an end inside in the radial direction D2. The inner surface 341 of the second-side plate part 34 is a surface of the second-side plate part 34 on the first side of the axial direction D1. The first-side plate part 33 has an inner surface 331 in contact with the seal member 30, and the inner surface 331 has the inner peripheral end 332 which is an end inside in the radial direction D2. The inner surface 331 of the first-side plate part 33 is a surface of the first-side plate part 33 on the second side of the axial direction D1.

An outer surface 333 of the first-side plate part 33 includes an outer peripheral-side region 334 and an inner peripheral-side region 335. The outer surface 333 is a surface of the first-side plate part 33 on the first side of the axial direction D1. The outer peripheral-side region 334 is a region of the outer surface 333 that is positioned radially outside beyond the inner peripheral end 342 of the second-side plate part 34 in the radial direction D2. The inner peripheral-side region 335 is a region of the outer surface 333 that is positioned radially inside beyond the outer peripheral-side region 334 in the radial direction D2.

The inner peripheral-side portion of the first-side plate part 33 is inclined with respect to the radial direction D2 so as to approach the second side of the axial direction D1, as it approaches inward in the radial direction D2. Accordingly, the inner peripheral-side region 335 is an inclined surface that is inclined to approach the second side of the axial direction D1, as it approaches inward in the radial direction D2. The outer peripheral-side region 334 is parallel to the radial direction D2. Therefore, the outer peripheral-side region 334 is positioned on the first side of the axial direction D1 with respect to the inner peripheral-side region 335.

Similarly, an inner peripheral-side region 336 of the inner surface 331 of the first-side plate part 33 is an inclined surface that is inclined so as to approach the second side of the axial direction D1, as it approaches inward in the radial direction D2. The inner peripheral-side region 336 of the inner surface 331 of the first-side plate part 33 is positioned on the opposite side of the axial direction D1 with respect to the inner peripheral-side region 335 of the outer surface 333.

Next, a method for manufacturing the valve device 10 according to the present embodiment will be described. The method for manufacturing the valve device 10 includes preparing one plate material 310 that is a member for forming the attachment ring 31 as illustrated in FIG. 3A, forming a cylindrical part 312 as illustrated in FIG. 3B, preparing the seal member 30 as illustrated in FIG. 3C, and holding the seal member 30 in the attachment ring 31 as illustrated in FIG. 3D.

Figure 3A:
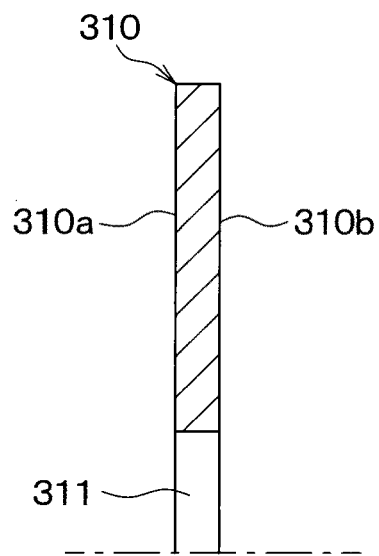
FIG. 3A is a cross-sectional view of a plate material, which illustrates a part of a manufacturing process of the valve device according to the first embodiment.

As illustrated in FIG. 3A, in preparing the plate material 310, the prepared plate material 310 is in the shape of a circular flat plate having a pair of main surfaces 310a and 310b. The plate material 310 has an opening 311 in which the rotation shaft 13 is to be arranged in the center.

Figure 3B:
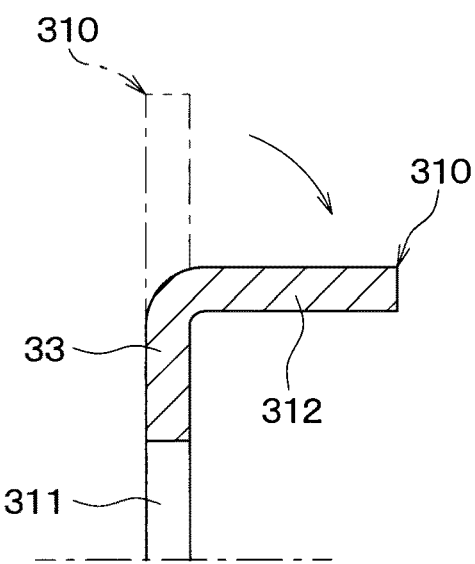
FIG. 3B is a cross-sectional view of the plate material, which illustrates a part of the manufacturing process of the valve device according to the first embodiment.

As illustrated in FIG. 3B, in forming the cylindrical part 312, the outer peripheral end-side part of the plate material 310 illustrated by dashed-dotted lines is cylindrically bent by a press drawing process that is a bending process as shown by an arrow in FIG. 3B. Accordingly, the first-side plate part 33 and the cylindrical part 312 are formed as illustrated by solid lines.

Figure 3C:
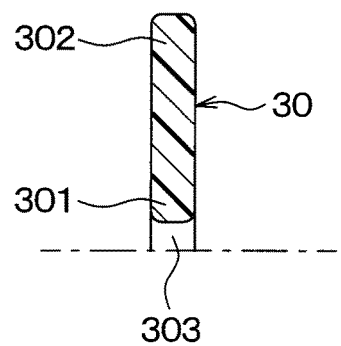
FIG. 3C is a cross-sectional view of a seal member, which illustrates a part of the manufacturing process of the valve device according to the first embodiment.
Figure 3D:
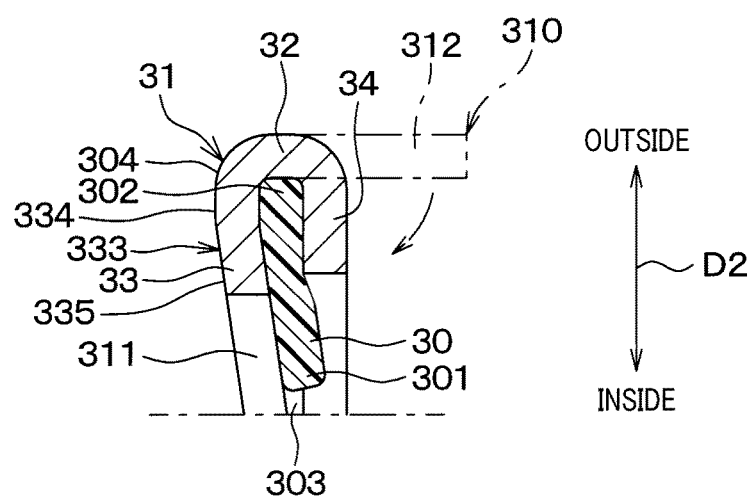
FIG. 3D is a cross-sectional view of the seal member and an attachment ring, which illustrates a part of the manufacturing process of the valve device according to the first embodiment.

As illustrated in FIG. 3C, in preparing the seal member 30, the prepared seal member 30 is in the shape of a circular flat plate having a pair of main surfaces. The seal member 30 has an opening 303 in which the rotation shaft 13 is to be arranged in the center. In this case, the inner peripheral end-side part 301 extends in parallel to the outer peripheral end-side part 302.

As illustrated in FIG. 3D, in holding the seal member 30 in the attachment ring 31, the outer peripheral end-side part 302 of the seal member 30 overlaps the cylindrical part 312 of the first-side plate part 33. In this state, the entire circumferential region of the portion of the cylindrical part 312 separated from the first-side plate part 33 is bent by wrap-crimping that is a bending process. The wrap-crimping is also called rotary crimping. Wrap-crimping is a process of pressing and bending a processed material by a punch while rotating the processed material or the punch. Accordingly, the annular part 32 and the second-side plate part 34 are formed. The seal member 30 is sandwiched between the first-side plate part 33 and the second-side plate part 34. Further, the inner peripheral-side portion of the first-side plate part 33 is inclined with respect to the radial direction D2 of the attachment ring 31. That is, the inner peripheral-side region 335 of the outer surface 333 of the first-side plate part 33 is inclined with respect to the radial direction D2. Accordingly, the outer peripheral-side region 334 of the outer surface 333 of the first-side plate part 33 is positioned on the first side of the axial direction D1 with respect to the inner peripheral-side region 335. The radial direction D2 of the attachment ring 31 coincides with the radial direction D2 of the rotation shaft 13 illustrated in FIG. 2.

As described above, bending the one plate material 310 makes it possible to form the annular part 32 and the second-side plate part 34 and sandwich the seal member 30 between the first-side plate part 33 and the second-side plate part 34. In addition, managing the conditions for the bending process makes it easy to incline the inner peripheral-side region 335 of the outer surface 333 of the first-side plate part 33.

The method for manufacturing the valve device 10 further includes assembling the rotation shaft 13 and the seal member 30 and assembling the rotation shaft 13 and the attachment ring 31 to the housing 11.

Figure 4:
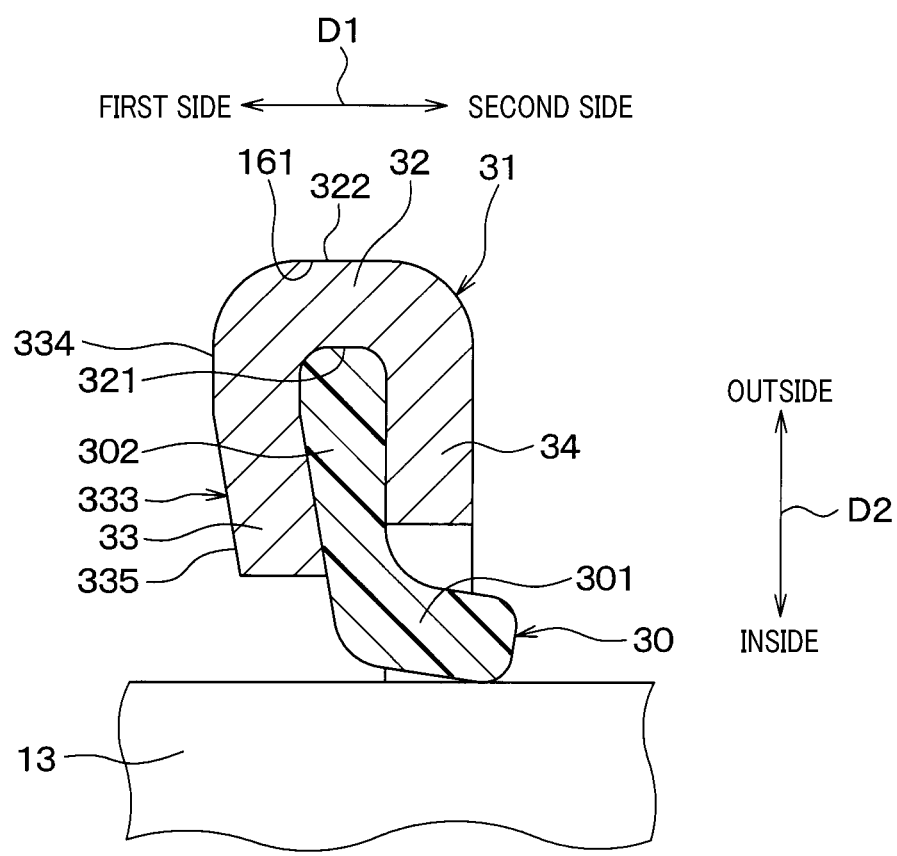
FIG. 4 is a cross-sectional view of the seal member, the attachment ring, and a rotation shaft, which illustrates a part of the manufacturing process of the valve device according to the first embodiment.

In assembling the rotation shaft 13 and the seal member 30, the rotation shaft 13 is inserted into the opening 303 of the seal member 30 illustrated in FIG. 3D from the first side to the second side of the axial direction D1. In this case, the diameter of the opening 303 of the seal member 30 is smaller than the diameter of the portion of the rotation shaft 13 to which the seal member 30 is attached. Therefore, the inner peripheral end-side part 301 of the seal member 30 is pressed toward the second side of the axial direction D1. Accordingly, as illustrated in FIG. 4, the inner peripheral end-side part 301 of the seal member 30 is bent toward the second side of the axial direction D1. In this manner, the seal member 30 is attached to the rotation shaft 13.

In assembling the rotation shaft 13 and the attachment ring 31 to the housing 11, as illustrated in FIG. 1, the rotation shaft 13 is inserted into the accommodation space 16 from the side of the accommodation space 16 opposite to the gas flow path 15 toward the gas flow path 15. That is, the rotation shaft 13 is inserted into the accommodation space 16 from the first side to the second side in the axial direction D1.

Then, as illustrated in FIG. 5, a press-fit punch 50 presses the attachment ring 31 from the first side to the second side of the axial direction D1. FIG. 5 does not illustrate the rotation shaft 13. The press-fit punch 50 is annular in shape in order to press the attachment ring 31 while avoiding the rotation shaft 13. The attachment ring 31 is pressed by the press-fit punch 50 into a position where the second-side plate part 34 abuts on the facing surface 162. Therefore, loads are applied to the attachment ring 31 from both the press-fit punch 50 and the facing surface 162.

A press surface 51 of the press-fit punch 50 used in this case is a flat surface orthogonal to the axial direction D1. When the press surface 51 presses the attachment ring 31, the press surface 51 faces the outer peripheral-side region 334 and the inner peripheral-side region 335 of the outer surface 333 of the first-side plate part 33 in the axial direction D1. Therefore, the press surface 51 is in contact only with the outer peripheral-side region 334 of the outer surface 333 of the first-side plate part 33.

In this manner, the attachment ring 31 is press-fitted into the tubular wall surface 161. The attachment ring 31 is fixed to the housing 11. In the method for manufacturing the valve device 10, assembling the attachment ring 31 holding the seal member 30 to the housing 11 and the assembling the rotation shaft 13 to the housing 11 may be performed in this order.

Next, the attachment ring 31 according to the present embodiment and an attachment ring according to a first comparative example will be compared. The attachment ring 40 according to the first comparative example corresponds to the attachment ring in the valve device described in PTL 1. The attachment ring 40 corresponds to the first comparative example has an outer ring 41 and an inner ring 42. The outer ring 41 is an outer annular member of the attachment ring 40. The inner ring 42 is an annular member arranged inside the outer ring 41.

The outer ring 41 has an outer ring cylindrical part 411 and an outer ring plate part 412. The outer ring cylindrical part 411 is in the shape of a circular cylinder extending in the axial direction D1 of the rotation shaft 13. The outer ring plate part 412 is in the shape of a plate extending along the radial direction D2 from the end portion of the outer ring cylindrical part 411 on the first side of the axial direction D1 toward the inside in the radial direction D2 of the rotation shaft 13.

The inner ring 42 has an inner ring cylindrical part 421 and an inner ring plate part 422. The inner ring cylindrical part 421 is in the shape of a circular cylinder extending in the axial direction D1 of the rotation shaft 13. The inner ring plate part 422 is in the shape of a plate extending along the radial direction D2 from the end portion of the inner ring cylindrical part 421 on the first side of the axial direction D1 toward the inside in the radial direction D2 of the rotation shaft 13.

The outer ring cylindrical part 411 is fixed by press-fitting to the tubular wall surface 161 of the housing 11. The inner ring cylindrical part 421 is fixed by crimping to the inner peripheral surface of the outer ring cylindrical part 411. The outer ring plate part 412 and the inner ring plate part 422 sandwich the seal member 30 in the axial direction D1. In this manner, the attachment ring 40 attaches the seal member 30 to the housing 11.

The attachment ring 40 according to the first comparative example is formed of two components, the outer ring 41 and the inner ring 42. On the other hand, the attachment ring 31 according to the present embodiment is formed of one component, which is reduced in the number of components as compared with the attachment ring 40 according to the first comparative example.

The attachment ring 40 according to the first comparative example requires the parts to fix the inner ring 42 and the outer ring 41 together at a position next in the axial direction D1 to the parts to sandwich and hold the seal member 30. This causes an increase in a dimension L3 of the attachment ring 40 in the axial direction D1. The parts to sandwich and hold the seal member are the outer ring plate part 412 and the inner ring plate part 422. The parts to fix the inner ring 42 and the outer ring 41 are the inner ring cylindrical part 421 and a part of the outer ring cylindrical part 411 in contact with the inner ring cylindrical part 421.

In the attachment ring 40 of the first comparative example, there is formed a large dead space 43 between the inner ring cylindrical part 421 and the rotation shaft 13. Condensed water, foreign matter, and the like contained in an exhaust gas may be accumulated in the dead space 43. In this case, the attachment ring 40, the seal member 30, and the rotation shaft 13 may erode. In addition, the rotation shaft 13 may be locked by the accumulated foreign matter.

In contrast to this, as illustrated in FIG. 2, according to the attachment ring 31 of the present embodiment, the first-side plate part 33 and the second-side plate part 34 are connected to each other with the annular part 32 in between. The first-side plate part 33 and the second-side plate part 34 are parts to sandwich and hold the seal member 30. The annular part 32 is positioned between the first-side plate part 33 and the second-side plate part 34 in the axial direction D1. This eliminates the need for providing the parts to fix the inner ring 42 to the outer ring 41 in the attachment ring 40 of the first comparative example. Therefore, it is possible to make a length L1 in the axial direction D1 of the attachment ring 31 shorter than a length L3 in the axial direction D1 of the attachment ring 40 of the first comparative example, by a length L2 in the axial direction D1 of the parts to fix. According to the attachment ring 31 of the present embodiment, the inner ring cylindrical part 421 is not provided. This reduces the size of the dead space between the attachment ring 31 and the rotation shaft 13. Therefore, it is possible to suppress the problem caused by the condensed water, foreign matter, and the like in the exhaust gas being accumulated in the dead space.

As described above, according to the present embodiment, it is possible to provide the valve device 10 that is capable of decreasing the number of components of the attachment ring 31 and reducing the dimension of the attachment ring 31 in the axial direction. Further, according to the present embodiment, the following advantageous effects can be obtained.

Figure 7A:
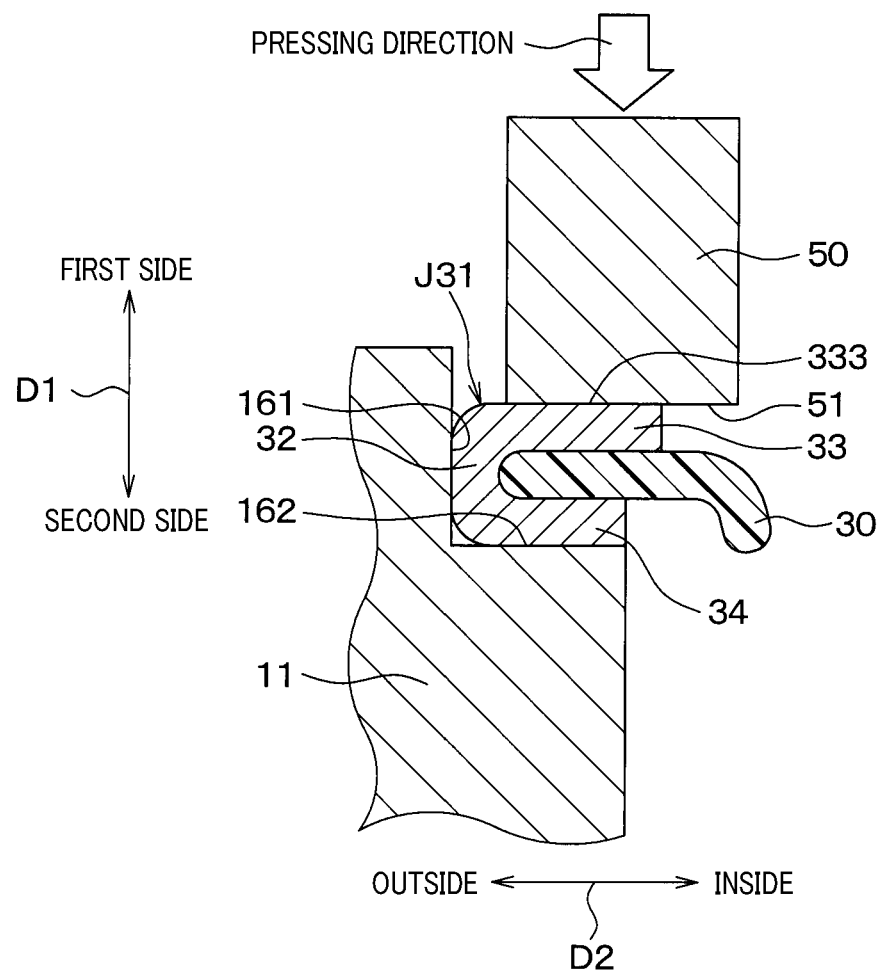
FIG. 7A is a cross-sectional view of a seal member, an attachment ring, and a housing, which illustrates a part of a manufacturing process of a valve device according to a second comparative example.

An attachment ring J31 of a second comparative example illustrated in FIG. 7A is different from the attachment ring 31 of the present embodiment in the shape of an outer surface 333 of a first-side plate part 33. In the attachment ring J31 of the second comparative example, a large part of the outer surface 333 of the first-side plate part 33 from the inner peripheral end to the outer peripheral end is a flat surface orthogonal to an axial direction D1. Therefore, as illustrated in FIG. 7A, if loads are applied to the attachment J31 from both a press-fit punch 50 and a facing surface 162, a press surface 51 contacts the large part of the outer surface 333 of the first-side plate part 33.

Figure 7B:
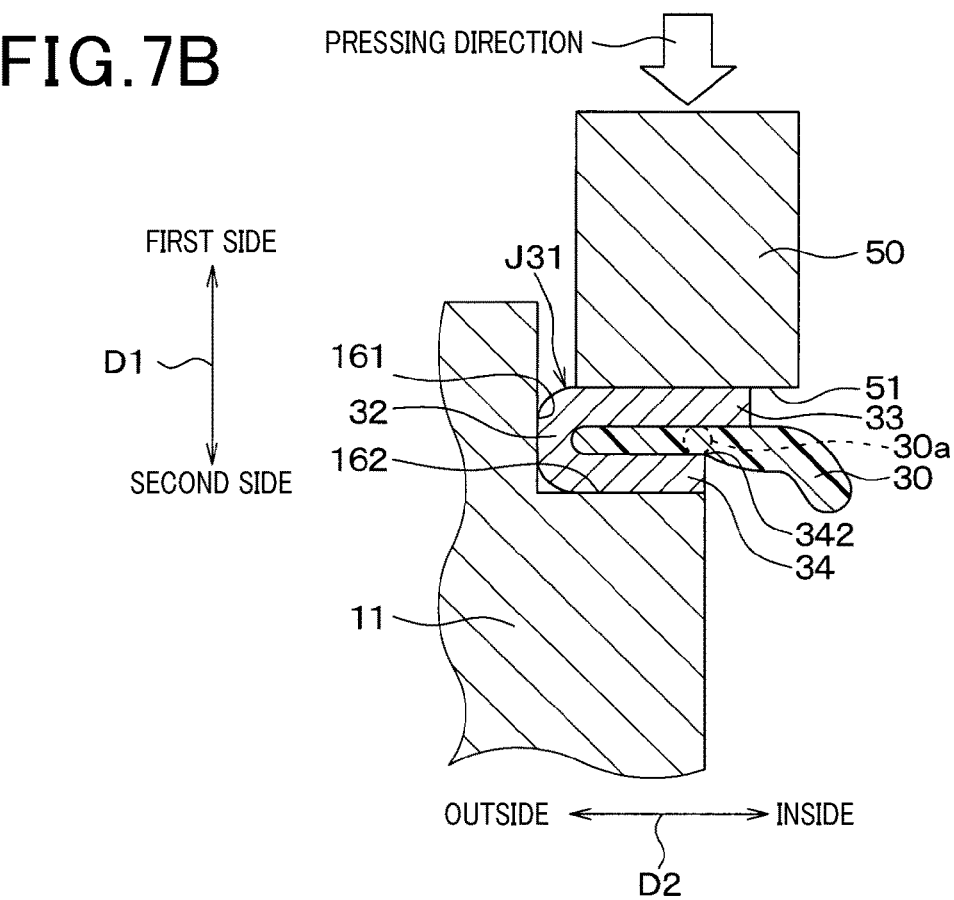
FIG. 7B is a cross-sectional view of the seal member, the attachment ring, and the housing, which illustrates a part of the manufacturing process of the valve device according to the second comparative example.

In this case, as illustrated in FIG. 7B, the first-side plate part 33 becomes deformed due to the loads at the time of press-fitting, and the seal member 30 is excessively compressed. In particular, the inventor has found a problem that, if a portion 30a of the seal member 30 sandwiched in the axial direction D1 between an inner peripheral end 342 of a second-side plate part 34 and the first-side plate part 33 is excessively compressed, the seal member 30 may be ruptured.

In contrast to this, according to the present embodiment, as illustrated in FIGS. 2 and 5, the inner peripheral-side region 335 of the outer surface 333 of the first-side plate part 33 is an inclined surface that is inclined so as to approach the second side of the axial direction D1, as it approaches inward in the radial direction D2. Accordingly, the outer peripheral-side region 334 of the outer surface 333 of the first-side plate part 33 is positioned on the first side of the axial direction D1 with respect to the inner peripheral-side region 335.

Therefore, as illustrated in FIG. 5, if loads are applied to the attachment ring 31 from both the press-fit punch 50 and the facing surface 162, the press surface 51 is in contact only with the outer peripheral-side region 334 of the outer surface 333 of the first-side plate part 33. Accordingly, the range of load application to the attachment ring 31 by the press-fit punch 50 and the facing surface 162 can be limited to the area outside in the radial direction D2 beyond the inner peripheral end 342 of the second-side plate part 34. This makes it possible to suppress excessive compression of the part of the seal member 30 sandwiched in the axial direction D1 between the inner peripheral end 342 of the second-side plate part 34 and the first-side plate part 33.

According to the present embodiment, as illustrated in FIG. 2, the inner peripheral-side region 335 of the outer surface 333 of the first-side plate part 33 is an inclined surface that is inclined so as to approach the second side of the axial direction D1, as it approaches inward in the radial direction D2. As illustrated in FIG. 3D, in the state before the insertion of the rotation shaft 13 into the seal member 30, the inner peripheral-side region 335 is an inclined surface. In this case, the seal member 30 is inclined with respect to the radial direction D2 so as to approach the second side of the axial direction D1, as it approaches inward in the radial direction D2.

This makes it easy to assembly the rotation shaft 13 and the seal member 30. That is, the rotation shaft 13 can be easily inserted into the opening 303 of the seal member 30 illustrated in FIG. 3D from the first side to the second side of the axial direction D1. In addition, it is possible to prevent the seal member 30 from being cut at the time of insertion of the rotation shaft 13.

Second Embodiment

Figure 8:
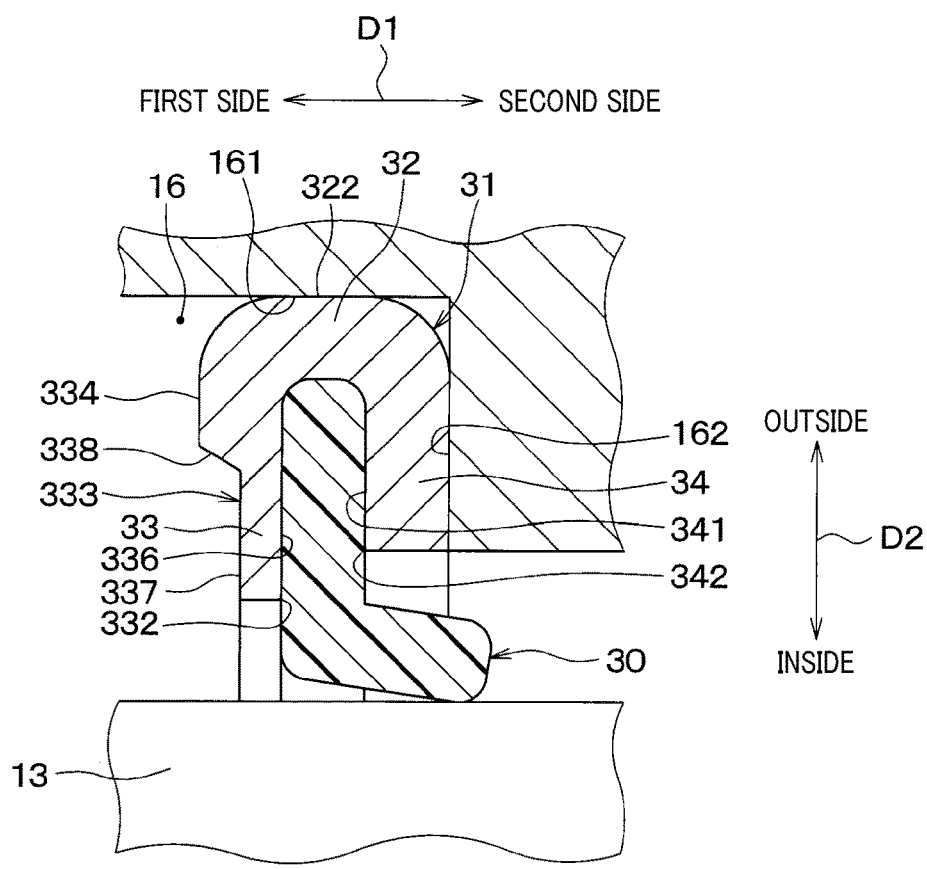
FIG. 8 is a cross-sectional view of a seal member, an attachment ring, a rotation shaft, and a housing according to a second embodiment, which corresponds to FIG. 2.

As illustrated in FIG. 8, the present embodiment is different from the first embodiment, in the shape of an outer surface 333 of a first-side plate part 33 of an attachment ring 31. The outer surface 333 includes an outer peripheral-side region 334, an inner peripheral-side region 337, and a step forming part 338.

The outer peripheral-side region 334 is parallel to a radial direction D2 as in the first embodiment. The inner peripheral-side region 337 is parallel to the radial direction D2 unlike the inner peripheral-side region 335 of the first embodiment. The step forming part 338 is connected to both the outer peripheral-side region 334 and the inner peripheral-side region 337. The step forming part 338 forms a step with a difference in position made in the axial direction D1 between the outer peripheral-side region 334 and the inner peripheral-side region 337. Accordingly, the outer peripheral-side region 334 is positioned on a first side of the axial direction D1 with respect to the inner peripheral-side region 337. Other components of the attachment ring 31 are the same as those in the first embodiment.

Figure 9:
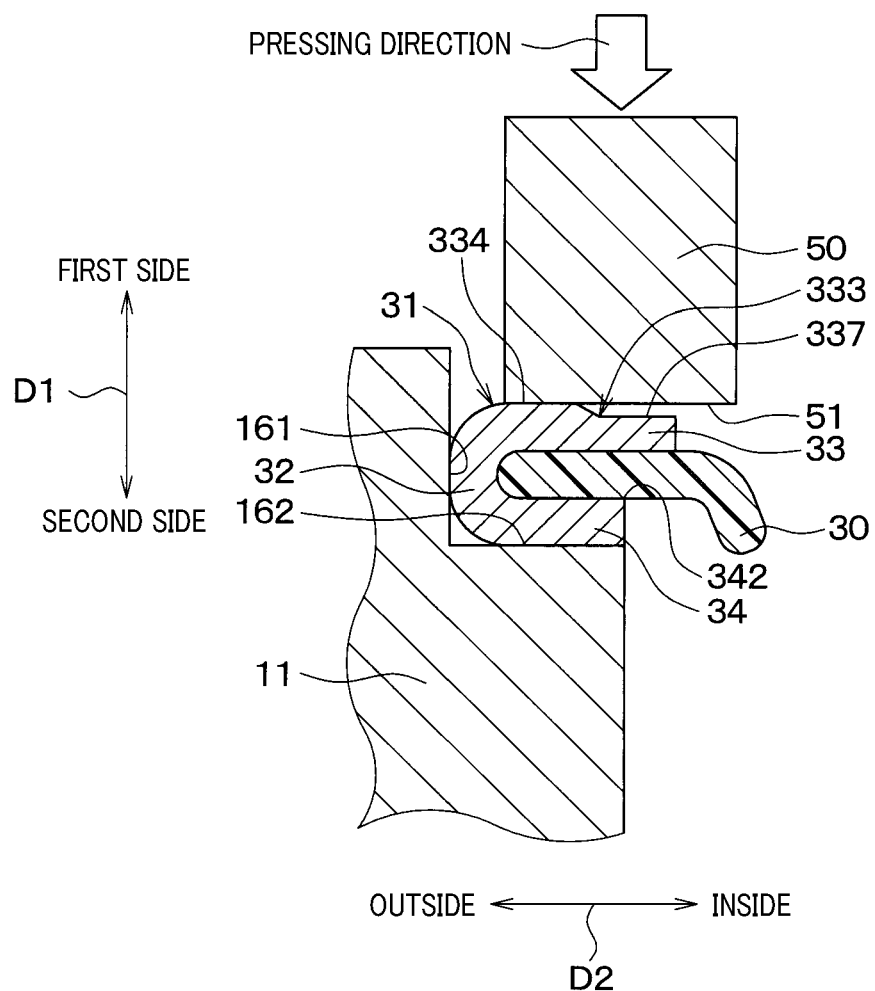
FIG. 9 is a cross-sectional view of the seal member, the attachment ring, and the housing, which corresponds to FIG. 5 and illustrates a part of a manufacturing process of a valve device according to the second embodiment.

According to a method for manufacturing a valve device 10, the attachment ring 31 is assembled to a housing 11 as in the first embodiment. As illustrated in FIG. 9, a press-fit punch 50 presses the attachment ring 31 from the first side to a second side of the axial direction D1. The attachment ring 31 is pressed by the press-fit punch 50 into a position where a second-side plate part 34 abuts on a facing surface 162. Therefore, loads are applied to the attachment ring 31 from both the press-fit punch 50 and the facing surface 162. At this time, the press surface 51 is in contact only with the outer peripheral-side region 334 of the outer surface 333 of the first-side plate part 33. Therefore, in the present embodiment, the same advantageous effects as those in the first embodiment can be obtained.

Third Embodiment

Figure 10:
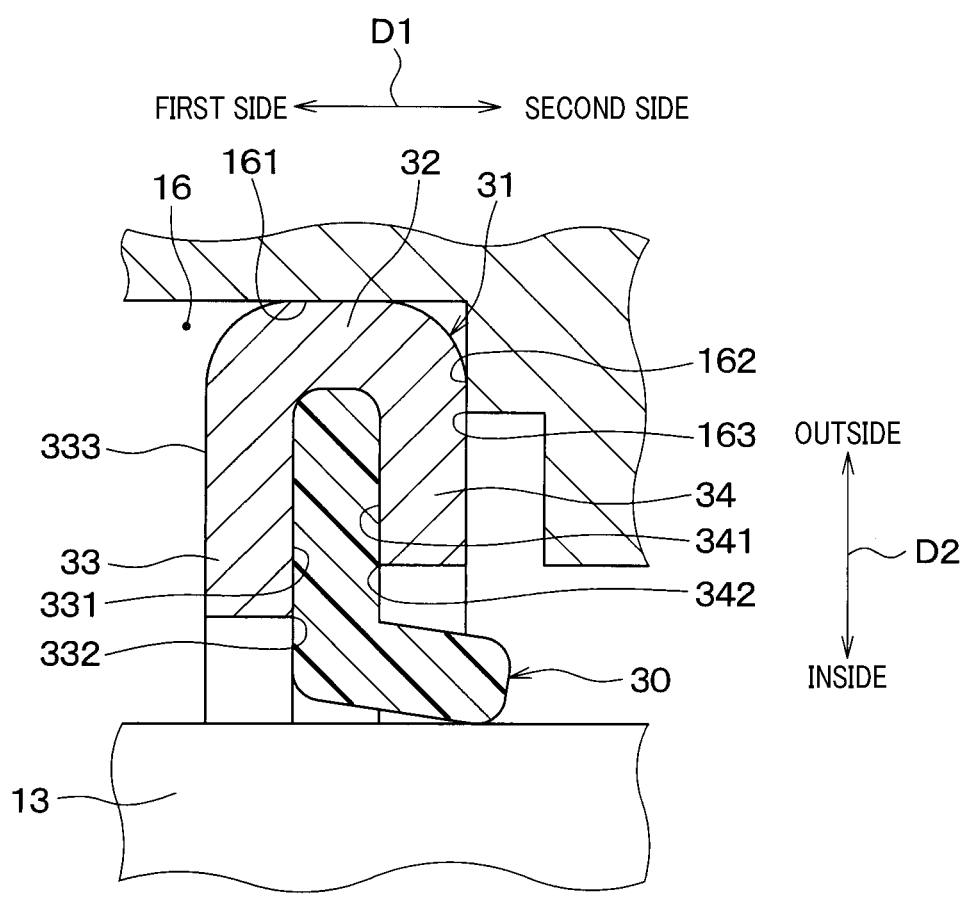
FIG. 10 is a cross-sectional view of a seal member, an attachment ring, a rotation shaft, and a housing according to a third embodiment, which corresponds to FIG. 2.

As illustrated in FIG. 10, the present embodiment is different from the first embodiment, in the position of an inner peripheral end 163 of a facing surface 162 of a housing 11. The inner peripheral end 163 is an end inside in a radial direction D2 of an area of the facing surface 162 in contact with a second-side plate part 34. The inner peripheral end 163 is positioned outside in the radial direction D2 with respect to an inner peripheral end 342 of the second-side plate part 34.

Figure 11:
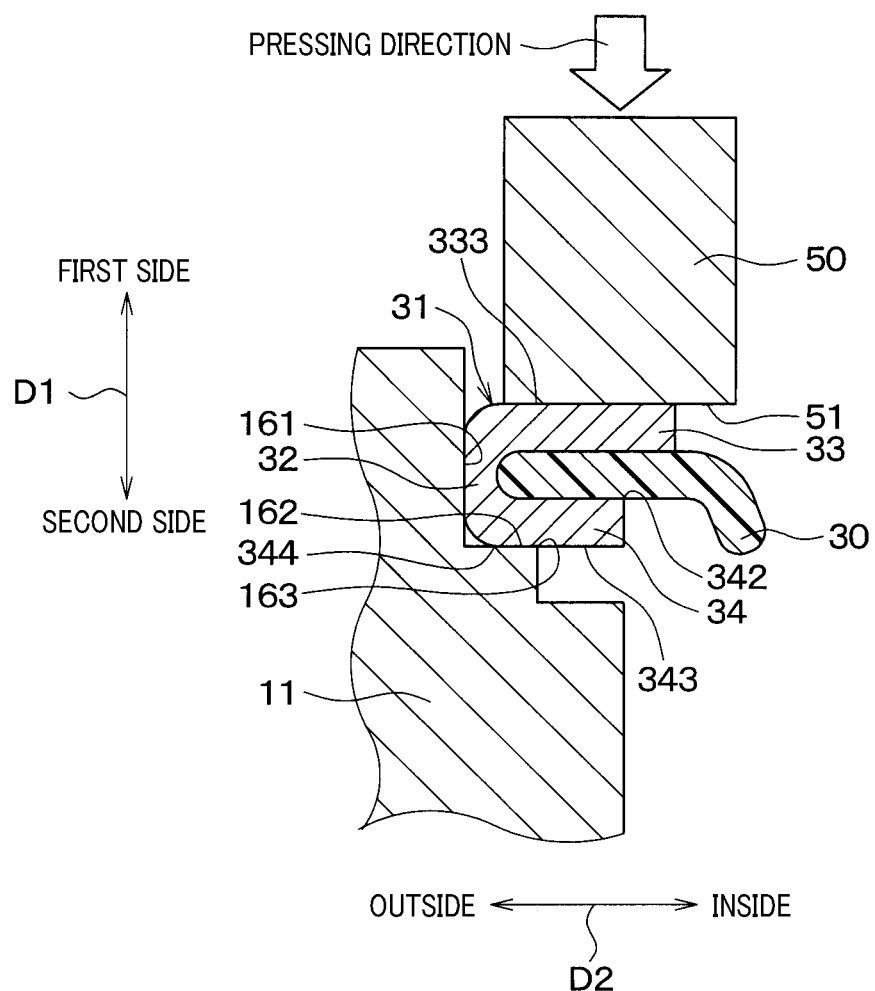
FIG. 11 is a cross-sectional view of the seal member, the attachment ring, and the housing, which corresponds to FIG. 5 and illustrates a part of a manufacturing process of a valve device according to the third embodiment.

According to a method for manufacturing a valve device 10, as in the first embodiment, an attachment ring 31 is assembled to the housing 11. As illustrated in FIG. 11, a press-fit punch 50 presses the attachment ring 31 from a first side to a second side of an axial direction D1. As illustrated in FIG. 11, a press-fit punch 50 presses the attachment ring 31 from the first side to the second side of the axial direction D1. The attachment ring 31 is pressed by the press-fit punch 50 into a position where the second-side plate part 34 abuts on the facing surface 162. Therefore, loads are applied to the attachment ring 31 from both the press-fit punch 50 and the facing surface 162. At this time, the facing surface 162 is in contact only with an outer peripheral-side region 344 of an outer surface 343 of the second-side plate part 34 outside in the radial direction D2 with respect to the inner peripheral end 342 of the second-side plate part 34. The outer surface 343 of the second-side plate part 34 is a surface of the second-side plate part 34 on the second side of the axial direction D1. Accordingly, the range of load application to the attachment ring 31 by the press-fit punch 50 and the facing surface 162 can be limited to the area outside in the radial direction D2 with respect to the inner peripheral end 342 of the second-side plate part 34. Therefore, in the present embodiment, the same advantageous effects as those in the first embodiment can be obtained.

In the present embodiment, the facing surface 162 is a flat surface parallel to the radial direction D2. However, the facing surface 162 may be slant with respect to the radial direction D2 as far as the facing surface 162 is in contact only with the outer peripheral-side region 344 of the outer surface 343 of the second-side plate part 34. In addition, at the part of the accommodation space 16 on the second side of the axial direction D1 beyond the facing surface 162, the diameter of the accommodation space 16 in the vicinity of the facing surface 162 is larger than the diameter of the other part of the accommodation space 16. However, the diameter of the accommodation space 16 may be uniform in the entire region on the second side of the axial direction D1 beyond the facing surface 162.

Fourth Embodiment

Figure 12:
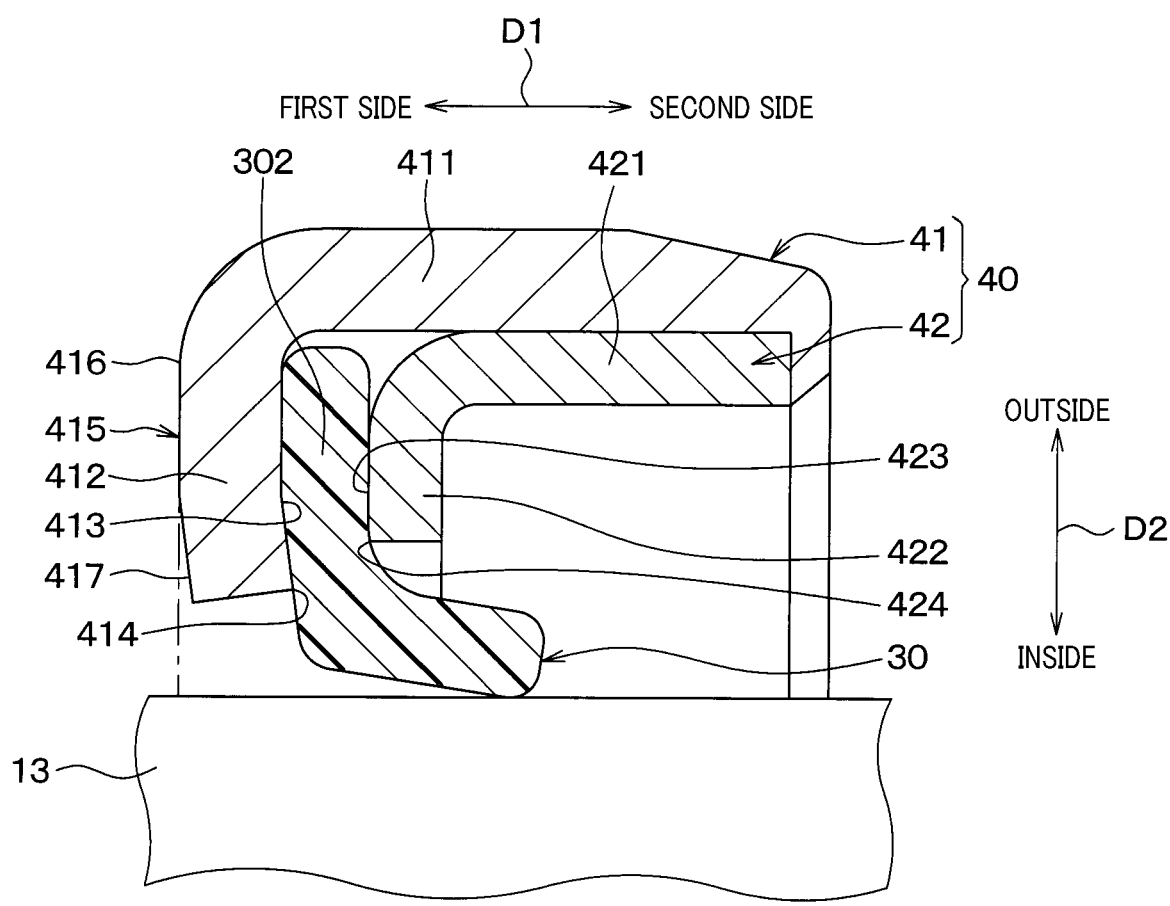
FIG. 12 is a cross-sectional view of a seal member, an attachment ring, and a rotation shaft according to a fourth embodiment, which corresponds to FIG. 2.

As illustrated in FIG. 12, in an attachment ring 40 of the present embodiment, the shape of the outer surface of the outer ring plate part 412 in the attachment ring 40 of the first comparative example is changed to the same shape as the outer surface 333 of the first-side plate part 33 in the attachment ring 31 of the first embodiment.

That is, the attachment ring 40 of the present embodiment has an outer ring 41 and an inner ring 42 similarly to the attachment ring 40 of the first comparative example. The outer ring 41 has an outer ring cylindrical part 411 and an outer ring plate part 412. The inner ring 42 has an inner ring cylindrical part 421 and an inner ring plate part 422. The outer ring plate part 412 and the inner ring plate part 422 sandwich and hold an outer peripheral end-side part 302 of a seal member 30 in an axial direction D1. The outer ring plate part 412 is in the shape of a plate that is positioned on a first side of the axial direction D1 with respect to the seal member 30 and extends along a radial direction D2. Therefore, the outer ring plate part 412 corresponds to the first-side plate part. The inner ring plate part 422 is in the shape of a plate that is positioned on a second side of the axial direction D1 with respect to the seal member 30 and extends along the radial direction D2. Therefore, the inner ring plate part 422 corresponds to the second-side plate part.

With the attachment ring 40 fixed to a housing 11, an inner peripheral end 424 of the inner ring plate part 422 is positioned outside in the radial direction D2 beyond an inner peripheral end 414 of the outer ring plate part 412. The inner peripheral end 424 of the inner ring plate part 422 is an end inside in the radial direction D2 of an inner surface 423 of the inner ring plate part 422 in contact with the seal member 30. The inner surface 423 of the inner ring plate part 422 is a surface of the inner ring plate part 422 on the first side of the axial direction D1. The inner peripheral end 414 of the outer ring plate part 412 is an end inside in the radial direction D2 of an inner surface 413 of the outer ring plate part 412 in contact with the seal member 30. The inner surface 413 of the outer ring plate part 412 is a surface of the outer ring plate part 412 on the second side of the axial direction D1.

An outer surface 415 of the outer ring plate part 412 includes an outer peripheral-side region 416 and an inner peripheral-side region 417. The outer surface 415 is a surface of the outer ring plate part 412 on the first side of the axial direction D1. The outer peripheral-side region 416 is a region of the outer surface 415 that is positioned outside in the radial direction D2 beyond an inner peripheral end 424 of the inner ring plate part 422. The inner peripheral-side region 417 is a region of the outer surface 415 that is positioned inside in the radial direction D2 beyond the outer peripheral-side region 416.

Unlike the attachment ring 40 in the first comparative example, the inner peripheral-side portion of the outer ring plate part 412 is inclined with respect to the radial direction D2 so as to approach the second side of the axial direction D1, as it approaches inward in the radial direction D2. Therefore, the inner peripheral-side region 417 is an inclined surface that is inclined so as to approach the second side of the axial direction D1, as it approaches inward in the radial direction D2. The outer peripheral-side region 416 is parallel to the radial direction D2. Accordingly, the outer peripheral-side region 416 is positioned on the first side of the axial direction D1 with respect to the inner peripheral-side region 417.

Figure 13:
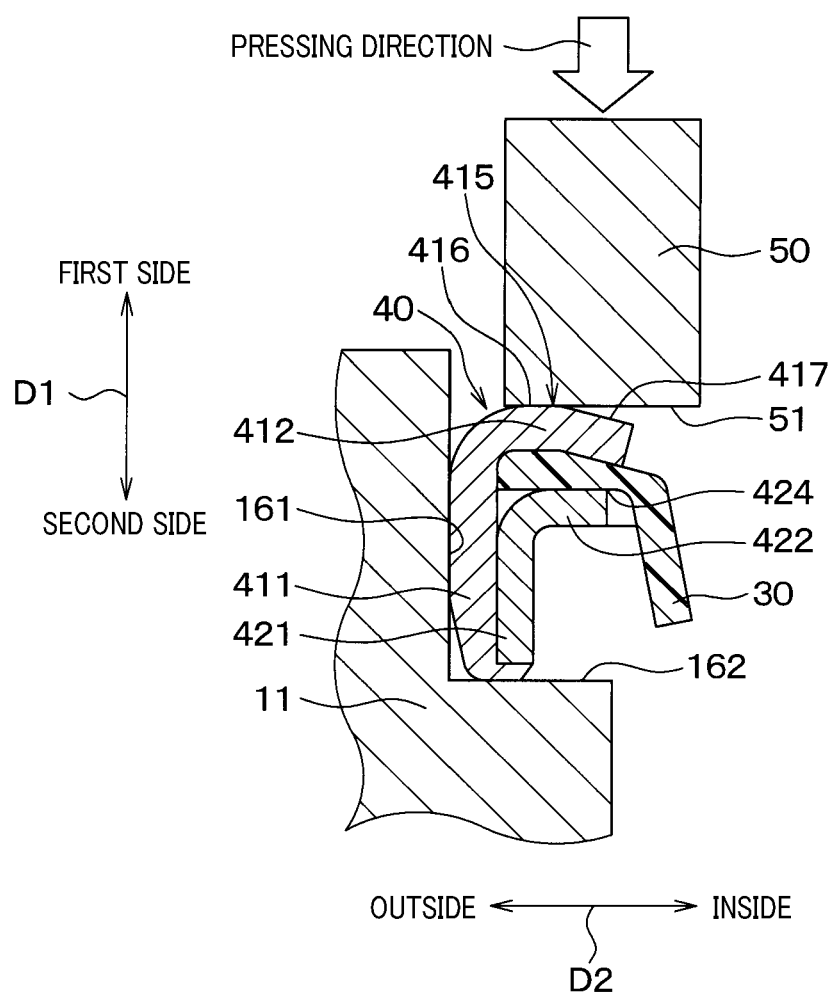
FIG. 13 is a cross-sectional view of the seal member, the attachment ring, and a housing, which corresponds to FIG. 5 and illustrates a part of a manufacturing process of a valve device according to the fourth embodiment.

The other components of the valve device 10 are the same as those of the first embodiment. In a method for manufacturing the valve device 10, as in the first embodiment, the attachment ring 40 is assembled to the housing 11. As illustrated in FIG. 13, a press-fit punch 50 presses the attachment ring 40 from a first side to a second side of the axial direction D1. FIG. 13 does not illustrate a rotation shaft 13. The attachment ring 40 is pressed by the press-fit punch 50 into a position where the attachment ring 40 abuts on a facing surface 162. Therefore, loads are applied to the attachment ring 40 from both the press-fit punch 50 and the facing surface 162.

A pressing surface 51 of the press-fit punch 50 used at this time is a flat surface orthogonal to the axial direction D1. When the press surface 51 presses the attachment ring 40, the press surface 51 faces the outer peripheral-side region 416 and the inner peripheral-side region 417 of the outer surface 415 of the outer ring plate part 412 in the axial direction D1. Therefore, the press surface 51 is in contact only with the outer peripheral-side region 416 of the outer surface 415 of the outer ring plate part 412.

Accordingly, the range of load application to the attachment ring 40 by the press-fit punch 50 and the facing surface 162 can be limited to the area outside in the radial direction D2 with respect to the inner peripheral end 424 of the inner ring plate part 422. Therefore, it is possible to suppress excessive compression of the part of the seal member 30 sandwiched in the axial direction D1 between the inner peripheral end 424 of the inner ring plate part 422 and the outer ring plate part 412.

Fifth Embodiment

Figure 14:
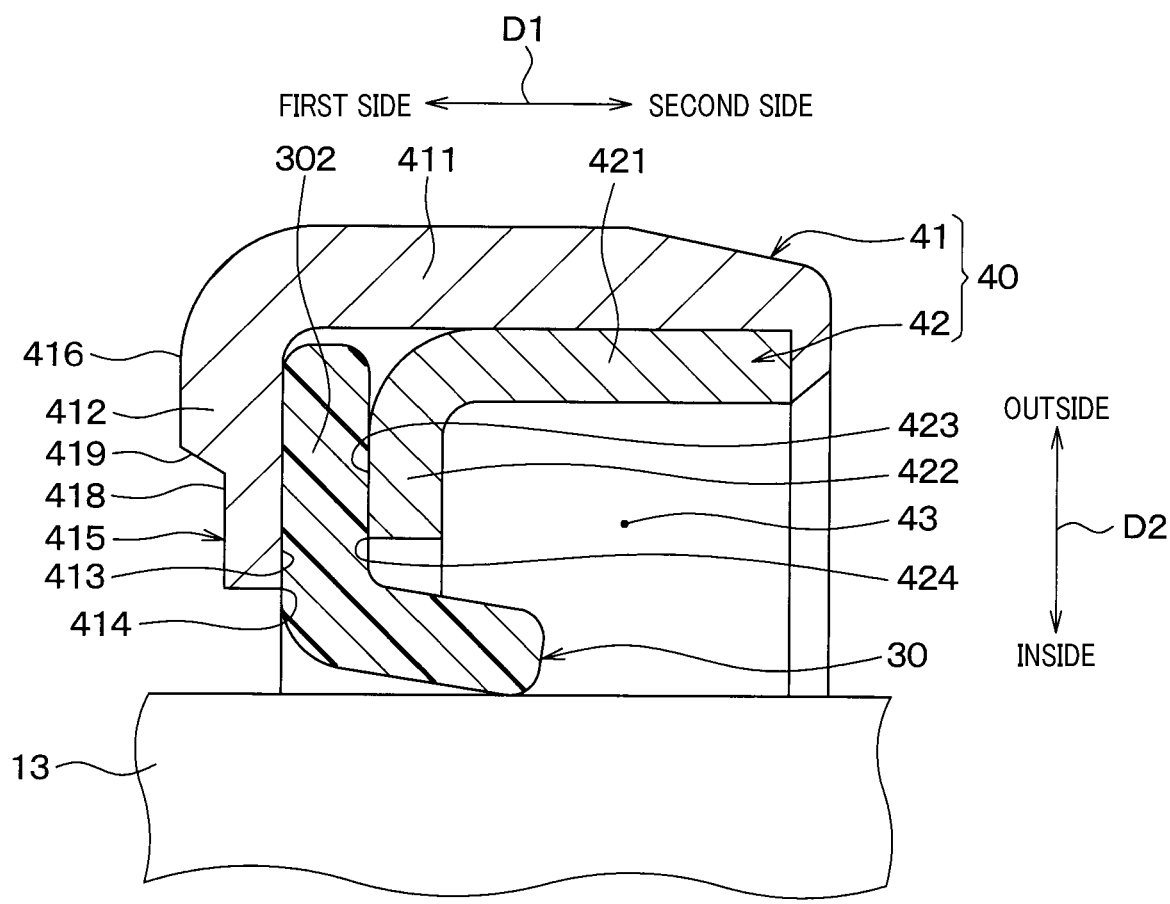
FIG. 14 is a cross-sectional view of a seal member, an attachment ring, and a rotation shaft according to a fifth embodiment, which corresponds to FIG. 2.

As illustrated in FIG. 14, in an attachment ring 40 of the present embodiment, the shape of the outer surface of the outer ring plate part 412 in the attachment ring 40 of the first comparative example is changed to the same shape as the outer surface of the first-side plate part 33 in the attachment ring 31 of the second embodiment. In the attachment ring 40 of the present embodiment, the shape of an outer surface 415 of an outer ring plate part 412 is different from that in the attachment ring 40 of the fourth embodiment. That is, the outer surface 415 of the outer ring plate part 412 includes an outer peripheral-side region 416, an inner peripheral-side region 418, and a step forming part 419.

The outer peripheral-side region 416 is parallel to a radial direction D2. Unlike the inner peripheral-side region 417 in the fourth embodiment, the inner peripheral-side region 418 is parallel to the radial direction D2. The step forming part 419 is connected to both the outer peripheral-side region 416 and the inner peripheral-side region 418. The step forming part 419 forms a step with a difference in position made in the axial direction D1 between the outer peripheral-side region 416 and the inner peripheral-side region 418. Accordingly, the outer peripheral-side region 416 is positioned on a first side of the axial direction D1 with respect to the inner peripheral-side region 418. The other components of the attachment ring 40 are the same as those of the fourth embodiment.

The components of the valve device 10 other than the attachment ring 40 are the same as those of the first embodiment. In a method for manufacturing the valve device 10, as in the first embodiment, the attachment ring 40 is assembled to a housing 11. As in the fourth embodiment, a press-fit punch 50 presses the attachment ring 40 from the first side to a second side of the axial direction D1 as illustrated in FIG. 15. FIG. 15 does not illustrate a rotation shaft 13. The attachment ring 40 is pressed by the press-fit punch 50 into a position where the attachment ring abuts on a facing surface 162. Therefore, loads are applied to the attachment ring 40 from both the press-fit punch 50 and the facing surface 162.

When the press surface 51 presses the attachment ring 40, the press surface 51 faces the outer peripheral-side region 416 and the inner peripheral-side region 418 of the outer surface 415 of the outer ring plate part 412 in the axial direction D1. At this time, the press surface 51 is in contact only with the outer peripheral-side region 416 of the outer surface 415 of the outer ring plate part 412. Accordingly, in the present embodiment, the same advantageous effects as those of the fourth embodiment can be obtained.

Other Embodiments (1) In the first and second embodiments, the outer peripheral-side region 334 of the outer surface 333 is a surface parallel to the radial direction D2. That is, the outer peripheral-side region 334 of the outer surface 333 is a region in surface contact with the press surface 51 of the press-fit punch 50. However, the outer peripheral-side region 334 of the outer surface 333 may be a linear region in line contact with the press surface 51 of the press-fit punch 50. The same thing applies to the outer peripheral-side regions 416 of the outer surfaces 415 in the fourth and fifth embodiments.

(2) In the above-described embodiments, the seal member 30 is made of a fluorine resin. However, the seal member 30 may be made of a synthetic resin other than a fluorine resin. The seal member may be made of another material having a sealing function such as synthetic rubber.

(3) In the above-described embodiments, the attachment ring 31 is made of a metallic material. However, the attachment ring 31 may be made of a material excellent in corrosion resistance other than a metallic material.

(4) In the above-described embodiments, at least a portion of the outer peripheral surface 322 of the annular part 32 of the attachment ring 31 is a cylindrical surface. However, the outer peripheral surface 322 of the annular part 32 may not be a cylindrical surface. The attachment ring 31 may be fixed to the housing 11 in a state where the outer peripheral surface 322 is in line contact with the tubular wall surface 161 of the housing 11.

(5) The valve device 10 in each of the above-described embodiments is used to increase or decrease the flow amount of an exhaust gas in an internal combustion engine that flows toward the intake flow path of the internal combustion engine. However, the valve device according to the present disclosure may be used for purposes other than the increase or decrease of the flow rate of an exhaust gas in the internal combustion engine. In this case, the type and arrangement of the bearing 14 may be different from those of the first embodiment. A seal member different from the seal member 30 may be arranged.

(6) The present disclosure is not limited to the above-described embodiments, can be modified as appropriate, and includes various modification examples and modifications within an equivalent scope. In addition, the above-described embodiments are not unrelated to each other but can be combined with each other as appropriate unless the combination is obviously impossible. In the above-described embodiments, it goes without saying that the elements constituting the embodiments are not necessarily essential unless they are clearly expressed as essential or are considered as obviously essential in principle. In the above-described embodiments, if numbers, values, amounts, and scopes of the constituent elements of the embodiments are mentioned, the constituent elements are not limited to specific numbers thereof unless these numbers are clearly expressed as essential in particular or these numbers are obviously limited to the specific numbers. In the above-described embodiments, if the materials, shapes, and positional relationships of the constituent elements are mentioned, the constituent elements are not limited to the mentioned materials, shapes, positional relationships, and the like unless the materials, shapes, positional relationships, and the like are clearly expressed as essential or the constituent elements are limited to the specific materials, shapes, positional relationships, and the like in principle.

What is claimed is:

1. A valve device comprising:
a housing in which a gas flow path through which a gas flows and an accommodation space that communicates with the gas flow path and accommodates a rotation shaft are formed;
a valve body that is arranged in the gas flow path and adjusts an opening of the gas flow path;
the rotation shaft that is arranged in the accommodation space and rotates around an axis to rotate the valve body;
a seal member that is arranged in the accommodation space so as to be positioned around an outer peripheral surface of the rotation shaft and is slidably in close contact with the outer peripheral surface of the rotation shaft to prevent passage of the gas between the rotation shaft and the housing; and
an annular attachment ring that is arranged in the accommodation space so as to be positioned around the outer peripheral surface of the rotation shaft and attaches the seal member to the housing, wherein
the seal member has an outer peripheral end-side part, and the outer peripheral end-side part is in a shape of a plate extending radially outward from the rotation shaft side along a radial direction of the rotation shaft,
the attachment ring has:
a first-side plate part that is positioned on a first side of an axial direction of the rotation shaft with respect to the seal member and is in a shape of a plate extending along the radial direction; and
a second-side plate part that is positioned on a second side of the axial direction with respect to the seal member and is in a shape of a plate extending along the radial direction,
the first-side plate part and the second-side plate part sandwich and hold the outer peripheral end-side part of the seal member in the axial direction,
the housing has, as inner wall surfaces forming the accommodation space, a tubular wall surface that surrounds the attachment ring and a facing surface that faces the second-side plate part in the axial direction,
the attachment ring is fixed to the housing in a state where the attachment ring is in contact with the tubular wall surface and the second-side plate part is in contact with the facing surface,
the second-side plate part has an inner surface in contact with the seal member, the inner surface of the second-side plate part has an end inside in the radial direction serving as an inner peripheral end of the second-side plate part, and the first-side plate part has an inner surface in contact with the seal member, the inner surface of the first-side plate part has an end inside in the radial direction serving as an inner peripheral end of the first-side plate part, the inner peripheral end of the second-side plate part being positioned outside in the radial direction beyond the inner peripheral end of the first-side plate part, the first-side plate part has an outer surface which is a surface of the first-side plate part on the first side of the axial direction, and the outer surface of the first-side plate part includes an outer peripheral-side region that is positioned outside in the radial direction beyond the inner peripheral end of the second-side plate part and an inner peripheral-side region that is positioned inside in the radial direction beyond the outer peripheral-side region, and the outer peripheral-side region is positioned on the first side of the axial direction with respect to the inner peripheral-side region.

2. The valve device according to claim 1, wherein the inner peripheral-side region is an inclined surface that is inclined to approach the second side of the axial direction, as it approaches inward in the radial direction.

3. The valve device according to claim 1, wherein the outer surface of the first-side plate part includes a step forming part that is connected to both the outer peripheral-side region and the inner peripheral-side region, and forms a step with a difference in position made in the axial direction between the outer peripheral-side region and the inner peripheral-side region.

4. A valve device comprising:
a housing in which a gas flow path through which a gas flows and an accommodation space that communicates with the gas flow path and accommodates a rotation shaft are formed;
a valve body that is arranged in the gas flow path to adjust an opening of the gas flow path;
the rotation shaft that is arranged in the accommodation space and rotates around an axis to rotate the valve body;
a seal member that is arranged in the accommodation space so as to be positioned around an outer peripheral surface of the rotation shaft and is slidably in close contact with the outer peripheral surface of the rotation shaft to prevent passage of the gas between the rotation shaft and the housing; and
an annular attachment ring that is arranged in the accommodation space so as to be positioned around the outer peripheral surface of the rotation shaft and attaches the seal member to the housing, wherein
the seal member has an outer peripheral end-side part, and the outer peripheral end-side part is in a shape of a plate extending radially outward from the rotation shaft side along a radial direction of the rotation shaft,
the attachment ring has:
a first-side plate part that is positioned on a first side of an axial direction of the rotation shaft with respect to the seal member and is in a shape of a plate extending along the radial direction; and a second-side plate part that is positioned on a second side of the axial direction with respect to the seal member and is in a shape of a plate extending along the radial direction, the first-side plate part and the second-side plate part sandwich and hold the outer peripheral end-side part of the seal member in the axial direction, the housing has, as inner wall surfaces forming the accommodation space, a tubular wall surface that surrounds the attachment ring and a facing surface that faces the second-side plate part in the axial direction, the attachment ring is fixed to the housing in a state where the attachment ring is in contact with the tubular wall surface and the second-side plate part is in contact with the facing surface, the second-side plate part has an inner surface in contact with the seal member, the inner surface of the second-side plate part has an end inside in the radial direction serving as an inner peripheral end of the second-side plate part, and the first-side plate part has an inner surface in contact with the seal member, the inner surface of the first-side plate part has an end inside in the radial direction serving as an inner peripheral end of the first-side plate part, the inner peripheral end of the second-side plate part being positioned outside in the radial direction beyond the inner peripheral end of the first-side plate part, and the facing surface has a contact area in contact with the second-side plate part, the facing surface has an inner peripheral end which is an end inside in the radial direction of the contact area, and the inner peripheral end of the facing surface is positioned outside in the radial direction with respect to the inner peripheral end of the second-side plate part.

5. The valve device according to claim 1, wherein
the attachment ring includes an annular part that is in an annular shape having an inner peripheral surface and an outer peripheral surface and is positioned around an outer peripheral end of the seal member,
the inner peripheral surface of the annular part faces the outer peripheral end of the seal member in the radial direction,
the outer peripheral surface of the annular part is in contact with the tubular wall surface, and
the annular part, the first-side plate part, and the second-side plate part are formed of one continuous plate material.

6. The valve device according to claim 4, wherein
the attachment ring includes an annular part that is in an annular shape having an inner peripheral surface and an outer peripheral surface and is positioned around an outer peripheral end of the seal member,
the inner peripheral surface of the annular part faces the outer peripheral end of the seal member in the radial direction,
the outer peripheral surface of the annular part is in contact with the tubular wall surface, and
the annular part, the first-side plate part, and the second-side plate part are formed of one continuous plate material.

* * * * *